(12) United States Patent
Park et al.

(10) Patent No.: US 12,518,806 B2
(45) Date of Patent: Jan. 6, 2026

(54) PROCESSING-IN-MEMORY DEVICE WITH ALL OPERATION MODE AND DISPERSION OPERATION MODE

(71) Applicant: SK hynix Inc., Icheon-si Gyeonggi-do (KR)

(72) Inventors: Joon Hong Park, Icheon-si Gyeonggi-do (KR); Dae Han Kwon, Icheon-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 686 days.

(21) Appl. No.: 17/839,217

(22) Filed: Jun. 13, 2022

(65) Prior Publication Data
US 2023/0230622 A1  Jul. 20, 2023

(30) Foreign Application Priority Data
Jan. 19, 2022 (KR) .................. 10-2022-0008142

(51) Int. Cl.
*G11C 7/10* (2006.01)
*G06F 7/544* (2006.01)
*G11C 7/04* (2006.01)
*G11C 7/22* (2006.01)
*G11C 8/18* (2006.01)

(52) U.S. Cl.
CPC .......... *G11C 7/1039* (2013.01); *G06F 7/5443* (2013.01); *G11C 7/04* (2013.01); *G11C 7/1063* (2013.01); *G11C 7/22* (2013.01); *G11C 8/18* (2013.01)

(58) Field of Classification Search
CPC ............ G06F 3/0659; G06F 7/50; G06F 7/52
USPC ............................................................ 710/1
See application file for complete search history.

(56) References Cited

U.S. PATENT DOCUMENTS

| | | | | |
|---|---|---|---|---|
| 2020/0089472 | A1* | 3/2020 | Pareek | G06F 9/3001 |
| 2020/0174749 | A1* | 6/2020 | Kang | G11C 7/1048 |
| 2021/0072986 | A1* | 3/2021 | Yudanov | G06F 9/3001 |
| 2021/0208814 | A1* | 7/2021 | Song | G06F 7/5443 |
| 2021/0208817 | A1* | 7/2021 | Shin | G06F 3/0679 |
| 2021/0210125 | A1* | 7/2021 | Song | G11C 7/1045 |
| 2021/0224038 | A1 | 7/2021 | Song | |
| 2021/0350837 | A1* | 11/2021 | Song | G11C 11/409 |
| 2021/0382693 | A1* | 12/2021 | Song | G06F 7/5443 |

FOREIGN PATENT DOCUMENTS

KR  1020210042757 A  4/2021

* cited by examiner

*Primary Examiner* — Titus Wong
(74) *Attorney, Agent, or Firm* — WILLIAM PARK AND ASSOCIATES LTD.

(57) ABSTRACT

A processing-in-memory (PIM) device includes a plurality of multiplication and accumulation (MAC) units, each of the MAC units including a memory bank and a MAC operator, and a control circuit configured to control the plurality of MAC units to perform an all MAC mode operation in which MAC operations are performed in all MAC units, among the plurality of MAC units, or a dispersion MAC mode operation in which the MAC operations are performed in some MAC units, among the plurality of MAC units.

23 Claims, 27 Drawing Sheets

FIG.2

[Weight Matrix (21) × Vector Matrix (22) = MAC Result Matrix (23)]

PROCESSING-IN-MEMORY DEVICE WITH ALL OPERATION MODE AND DISPERSION OPERATION MODE

CROSS-REFERENCE TO RELATED APPLICATIONS

The present application claims priority under 35 U.S.C. 119(a) to Korean Patent Application No. 10-2022-0008142, filed on Jan. 19, 2022, which is incorporated herein by reference in its entirety.

BACKGROUND

1. Technical Field

Various embodiments of the present disclosure relate to processing-in-memory (hereinafter, referred to as "PIM") devices, and more particularly, to PIM devices with an all operation mode and a dispersion operation mode.

2. Related Art

Recently, interest in artificial intelligence is rapidly increasing not only in the information technology (IT) industry, but also in the financial and medical industries. Accordingly, the introduction of artificial intelligence, more precisely, deep learning, is being considered and prototyped in various fields. In general, deep learning is a collective term for technology that effectively learns neural networks (DNNs) or deep networks that increase the number of layers in traditional neural networks and uses them for pattern recognition or inferences.

One of the reasons for such widespread interest in deep learning may be an improvement in the performance of processors that perform operations. In order to improve the performance of artificial intelligence, learning is performed by stacking up to hundreds of layers of neural networks. This trend has continued in recent years, and as a result, the amount of computation that is required for the hardware that actually performs the computation has increased exponentially. Moreover, in the case of the existing hardware system in which the memory and the processor are separated, the limitation of the amount of data communication between a memory and a processor hinders the improvement of the artificial intelligence hardware performance. In order to solve this problem, in recent years, as an artificial intelligence accelerator, a processing-in-memory (PIM) structure in which the processor and the memory are integrated in a semiconductor chip itself has been adopted. The processing-in-memory (PIM) device directly performs computational operations within the device by using data that is stored in an internal memory inside the device, thereby improving data processing speed in a neural network.

SUMMARY

A processing-in-memory (PIM) device according to an embodiment of the present disclosure may include a plurality of multiplication and accumulation (MAC) units, each of the MAC units including a memory bank and a MAC operator, and a control circuit configured to control the plurality of MAC units to perform an all MAC mode operation in which MAC operations are performed in all MAC units, among the plurality of MAC units, or a dispersion MAC mode operation in which the MAC operations are performed in some MAC units, among the plurality of MAC units.

BRIEF DESCRIPTION OF THE DRAWINGS

Certain features of the disclosed technology are illustrated by various embodiments with reference to the attached drawings.

FIG. 2 is a diagram illustrating an example of a MAC operation performed in the PIM device of FIG. 1.

DETAILED DESCRIPTION OF THE EMBODIMENTS

Figure 1:
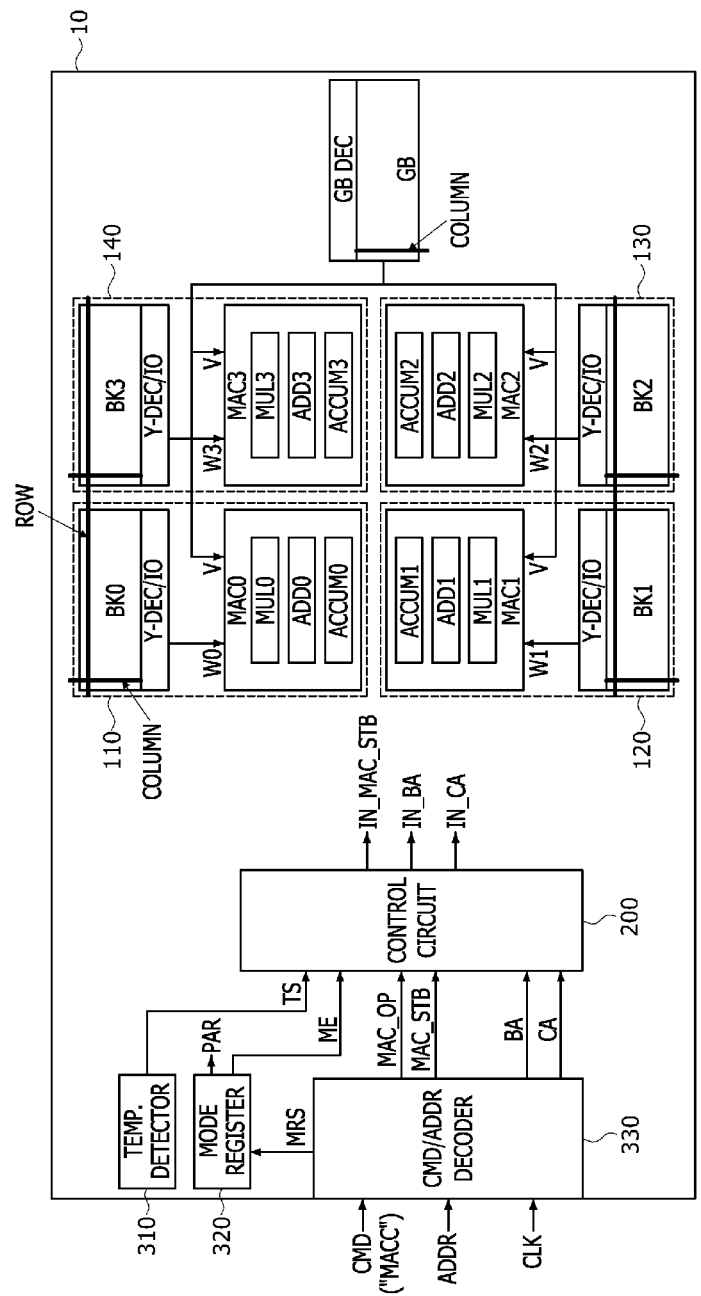
FIG. 1 is a diagram illustrating a PIM device according to an embodiment of the present disclosure.

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements.

Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure. Although the various embodiments described below take a DRAM as an example as a memory device, it is obvious that the present invention is not limited thereto. The various embodiments may be equally applicable to, for example, SRAM, synchronous DRAM (SDRAM), double data rate synchronous DRAM (DDR SDRAM, DDR2 SDRAM, DDR3 SDRAM, etc.), graphics double data rate synchronous DRAM (GDDR, GDDR2, GDDR3 etc.), quad data rate dRAM (QDR DRAM), RAMBUS XDR DRAM (XDR DRAM), fast page mode DRAM (FPM DRAM), video DRAM (VDRAM), extended data output DRAM (EDO DRAM), burst EDO DRAM (BEDO DRAM), multibank DRAM (MDRAM), synchronous graphics RAM (SGRAM), and/or many other forms of DRAM.

Various embodiments are directed to a processing-in-memory (PIM) device with an all operation mode and a dispersion operation mode.

The PIM device according to the present disclosure may perform various arithmetic and logic operations. Hereinafter, a case in which the PIM device performs multiplication and accumulation (MAC) operations, such as matrix multiplication, will be exemplified. Accordingly, the term "MAC operation" may be replaced with a term related to various other operations.

FIG. 1 is a diagram illustrating a PIM device 10 according to an embodiment of the present disclosure. Referring to FIG. 1, the PIM device 10 may include a plurality of MAC units, for example, first to fourth MAC units 110-140, a global buffer GB, a control circuit 200, a temperature detector 310, a mode register 320, and a command/address decoder 330. Each of the first to fourth MAC units 110-140 may be composed of a memory bank and a MAC operator. The first MAC unit 110 may be composed of a first memory bank BK0 and a first MAC operator MAC0. The second MAC unit 120 may be composed of a second memory bank BK1 and a second MAC operator MAC1. The third MAC unit 130 may be composed of a third memory bank BK2 and a third MAC operator MAC2. In addition, the fourth MAC unit 140 may be composed of a fourth memory bank BK3 and a fourth MAC operator MAC3.

Each of the first to fourth memory banks BK0-BK3 may be selected by an internal bank address signal IN_BA. Each of the first to fourth memory banks BK0-BK3 may have a cell region that is designated by a row and a column. The rows of the first to fourth memory banks BK0-BK3 may be selected by a row address. Although not shown in the drawing, the rows, among the rows of the first to fourth memory banks BK0-BK3, selected by the row address, may be activated together by an active control signal. The columns of the first to fourth memory banks BK0-BK3 may be selected by an internal column address IN_CA. Each of the first to fourth memory banks BK0-BK3 may include a Y-decoder/input and output circuit Y-DEC/IO for data transmission. The first to fourth memory banks BK0-BK3 may provide data that is used in the MC operations, for example, weight data W0-W3 to the first to fourth MAC operators MAC0-MAC3.

Each of the first to fourth MAC operators MAC0-MAC3 may perform a MAC operation on the weight data W0-W3 and vector data V. Each of the first to fourth MAC operators MAC0-MAC3 may include a multiplication circuit, an addition circuit, and an accumulator. The first MAC operator MAC0 may include a first multiplication circuit MUL0, a first addition circuit ADD0, and a first accumulator ACCUM0. The second MAC operator MAC1 may include a second multiplication circuit MUL1, a second addition circuit ADD1, and a second accumulator ACCUM1. The third MAC operator MAC2 may include a third multiplication circuit MUL2, a third addition circuit ADD2, and a third accumulator ACCUM2. The fourth MAC operator MAC3 may include a fourth multiplication circuit MUL3, a fourth addition circuit ADD3, and a fourth accumulator ACCUM3.

The first MAC operator MAC0 of the first MAC unit 110 may receive the first weight data W1 and the vector data V from the first memory bank BK0 and the global buffer GB, respectively. The first multiplication circuit MUL0 of the first MAC operator MAC0 may perform a multiplication operation on the first weight data W0 and the vector data V to generate first multiplication data. The first addition circuit ADD0 may add the first multiplication data to generate first addition data. The first accumulator ACCUM0 may perform an accumulation operation on the first addition data and latch data to generate latch data. When all of the first MAC operations are finished, the latch data that is generated in the first accumulator ACCUM0 may constitute first MAC result data.

The second MAC operator MAC1 of the second MAC unit 120 may receive the second weight data W2 and the vector data V from the second memory bank BK1 and the global buffer GB, respectively. The second multiplication circuit MUL1 of the second MAC operator MAC1 may perform a multiplication operation on the second weight data W1 and the vector data V to generate second multiplication data. The second addition circuit ADD1 may add the second multiplication data to generate second addition data. The second accumulator ACCUM1 may perform an accumulation operation on the second addition data and latch data to generate latch data. When all of the second MAC operations are finished, the latch data that is generated in the second accumulator ACCUM1 may constitute second MAC result data.

The third MAC operator MAC2 of the third MAC unit 130 may receive the third weight data W2 and the vector data V from the third memory bank BK2 and the global buffer GB, respectively. The third multiplication circuit MUL2 of the third MAC operator MAC2 may perform a multiplication operation on the third weight data W2 and the vector data V to generate third multiplication data. The third addition circuit ADD2 may add the third multiplication data to generate third addition data. The third accumulator ACCUM2 may perform an accumulation operation on the third addition data and latch data to generate latch data. When all of the third MAC operations are finished, the latch data that is generated in the third accumulator ACCUM2 may constitute third MAC result data.

The fourth MAC operator MAC3 of the fourth MAC unit 140 may receive the fourth weight data W3 and the vector data V from the fourth memory bank BK3 and the global buffer GB, respectively. The fourth multiplication circuit MUL3 of the fourth MAC operator MAC3 may perform a multiplication operation on the fourth weight data W3 and the vector data V to generate fourth multiplication data. The fourth addition circuit ADD3 may add the fourth multiplication data to generate fourth addition data. The fourth accumulator ACCUM3 may perform an accumulation operation on the fourth addition data and latch data to generate latch data. When all of the fourth MAC operations are finished, the latch data that is generated in the fourth accumulator ACCUM3 may constitute fourth MAC result data.

The global buffer GB may provide the vector data V that is used in the MAC operations to the first to fourth MAC units 110-140. The vector data V that is output from the global buffer GB may be commonly transmitted to the first to fourth MAC operators MAC0-MAC3. The global buffer GB may include a global buffer decoder GB DEC for input/output of the vector data V. The vector data V may be stored in columns in the global buffer GB. The columns of the global buffer GB may be selected by the internal column address IN_CA.

The control circuit 200 may control the MAC operations of the first to fourth MAC units 110-140. The control circuit 200 may allow the first to fourth MAC units 110-140 to perform MAC operations according to an all MAC mode or may allow the first to fourth MAC units 110-140 to perform MAC operations according to a dispersion MAC mode. Hereinafter, the "all MAC mode" may be defined as a mode in which the MAC operations are simultaneously performed in all first to fourth MAC units 110-140. The "dispersion MAC mode" may be defined as a mode in which the MAC operations are dispersedly performed in some MAC unit(s) of the first to fourth MAC units 110-140, "some" being defined as one or more, but not all. The control circuit 200 may receive a temperature signal TS, a mode enable signal ME, a MAC control signal MAC_OP, a MAC strobe signal MAC_STB, a bank address signal BA, and a column address signal CA. The control circuit 200 may generate and output an internal MAC strobe signal IN_MAC_STB, an internal bank address signal IN_BA, and an internal column address signal IN_CA based on the input signals.

When the control circuit 200 performs a control operation for the first to fourth MAC units 110-140 in the all MAC mode, the control circuit 200 may output the MAC strobe signal MAC_STB, as is, as the internal MAC strobe signal IN_MAC_STB. In the all MAC mode, the control circuit 200 may output the bank address signal BA, as is, as the internal bank address signal IN_BA. In the all MAC mode, the control circuit 200 may output the column address signal CA, as is, as the internal column address signal IN_CA. Accordingly, in the all MAC mode, the first to fourth MAC units 110-140 may simultaneously perform the first to fourth MAC operations by using weight data and vector data that are designated by the internal column address signal IN_CA (i.e., the column address signal CA).

When the control signal performs a control operation for the first to fourth MAC units 110-140 in the dispersion MAC mode, the control circuit 200 may generate and output an internal MAC strobe signal IN_MAC_STB with more pulses than the MAC strobe signal MAC_STB. In the dispersion MAC mode, the first to fourth MAC operations in the first to fourth MAC units 110-140 may be dispersedly performed in synchronization with the pulses of the internal MAC strobe signal IN_MAC_STB. In the dispersion MAC mode, the control circuit 200 may generate and output an internal bank address signal IN_BA configured such that the first to fourth memory banks BK0-BK3 are dispersedly selected. In the dispersion MAC mode, the control circuit 200 may generate and output the internal column address signal IN_CA, which is configured by repeating a column address signal CA. Therefore, in the dispersion MAC mode, the first to fourth MAC units 110-140 may perform the first to fourth MAC operations in a dispersion manner that is defined by the internal MAC strobe signal IN_MAC_STB and the internal bank address signal IN_BA.

The temperature detector 310 may receive temperature information regarding temperatures that are detected in various regions within the PIM device 10, in particular, in the first to fourth MAC units 110-140. The temperature information may be provided from a plurality of temperature sensors that are disposed in the PIM device 10. The temperature detector 310 may generate and output a temperature signal TS based on the temperature information. In an embodiment, the temperature detector 310 may generate and output the temperature signal TS based on a result of comparing the temperature information of the first to fourth MAC units 110-140 with a setting value. Here, the setting value may be set to a temperature that may deteriorate the MAC operation performance of the first to fourth MAC units 110-140. For example, when the temperature according to the temperature information is smaller than the setting value, the temperature detector 310 may output a temperature signal TS of a first logic level (hereinafter, logic "low" level). On the other hand, when the temperature according to the temperature information is equal to or greater than the setting value, the temperature detector 310 may output a temperature signal TS of a second logic level (hereinafter, logic "high" level). The temperature detector 310 may transmit the temperature signal TS to the control circuit 200.

The mode register 320 may store setting values for various operations of the PIM device 10. The mode register 320 may store setting values that are necessary for the all MAC mode and setting values that are necessary for the dispersion MAC mode. The setting values stored in the mode register 320 may be defined by a mode register setting signal MRS that is transmitted through the command/address decoder 330. In an embodiment, the mode register setting signal MRS may be included in the address signal ADDR to be transmitted from an external device. The mode register 320 may generate and output a mode enable signal ME. The mode register 320 may transmit the mode enable signal ME to the control circuit 200. In an embodiment, a mode enable signal ME at a logic "low" level may cause the PIM device 10 to operate only in the all MAC mode. On the other hand, a mode enable signal ME at a logic "high" level may cause the PIM device 10 to operate in the dispersion MAC mode in addition to the all MAC mode.

The command/address decoder 330 may receive a command CMD, an address signal ADDR, and a reference clock signal CLK from outside of the PIM device 10, for example, a host or a controller (not shown). The command/address decoder 330 may receive a MAC command MACC as the command CMD. When the MAC command MACC is transmitted, the command/address decoder 330 may generate the MAC control signal MAC_OP and the MAC strobe signal MAC_STB and may transmit the MAC control signal MAC_OP and the MAC strobe signal MAC_STB to the control circuit 200 in response to the MAC command MACC. Although not shown in the drawing, the command/address decoder 330 may receive an active command, a pre-charge command, a read command, a write command, and a MAC result read command as the command CMD, and in this case, may generate and output corresponding control signals. The command/address decoder 330 may latch the address signal ADDR that is transmitted from an external device. The command/address decoder 330 may generate the bank address signal BA and the column address signal CA based on the latched address signal ADDR and transmit the bank address signal BA and the column address signal CA to the control circuit 200. When the address signal ADDR includes mode register information, the command/address decoder 330 may generate the mode register setting signal MRS to transmit the mode register setting signal MRS to the mode register 320.

Figure 2:
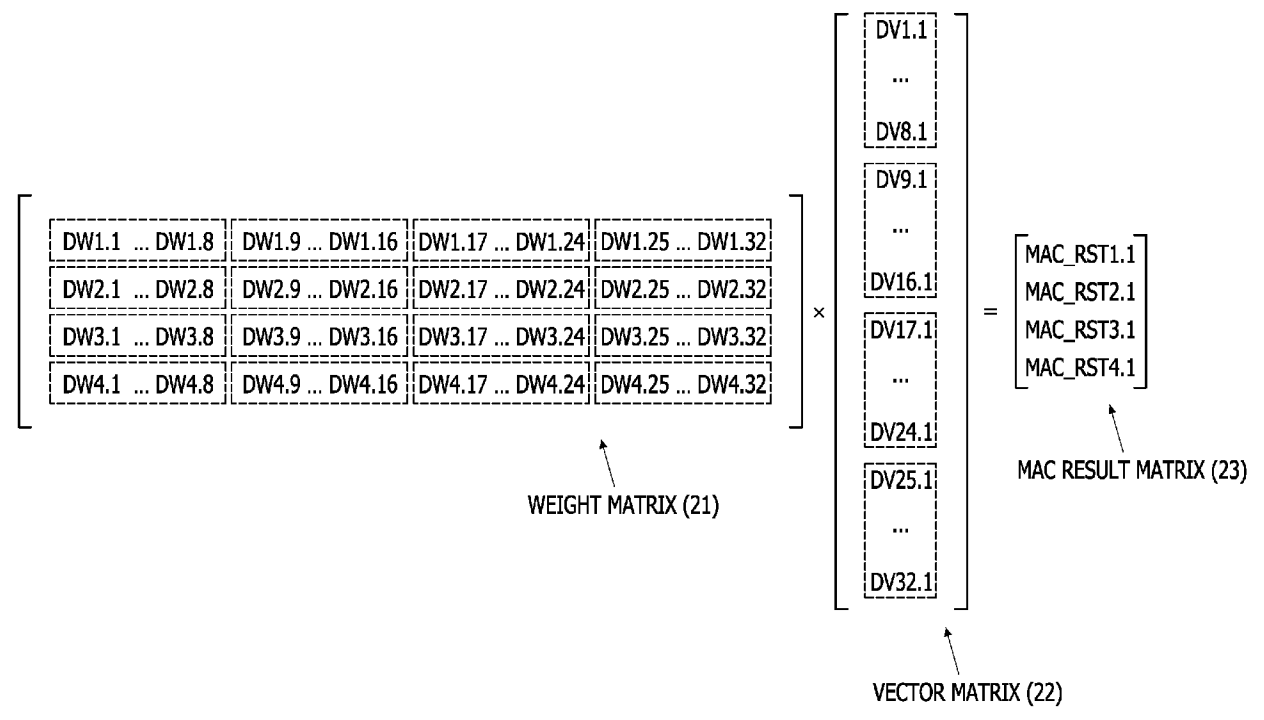

FIG. 2 is a diagram illustrating an example of a MAC operation performed in the PIM device 10 of FIG. 1. The MAC operation in the PIM device 10 of FIG. 1 may be performed by a matrix multiplication operation on a weight matrix and a vector matrix, and a MAC result matrix may be obtained as a result of the matrix multiplication operation. Hereinafter, a case in which the weight matrix 21 has a size of 4 rows and 32 columns and the vector matrix 22 has a size of 32 rows and 1 column will be exemplified. In this case, the MAC result matrix 23 may have a size of 4 rows and 1 column.

Referring to FIG. 2, the weight matrix 21 may have 128 elements (hereinafter, referred to as "weight data"). In a first row of the weight matrix 21, first weight data DW1.1-DW1.32 may be arranged from a first column to a $32^{nd}$ column. In a second row of the weight matrix 21, second weight data DW2.1-DW2.32 may be arranged from a first column to a $32^{nd}$ column. In a third row of the weight matrix 21, third weight data DW3.1-DW3.32 may be arranged from a first column to a $32^{nd}$ column. In addition, in a fourth row of the weight matrix 21, fourth weight data DW4.1-DW4.32 may be arranged from a first column to a $32^{nd}$ column. The vector matrix 22 may have 32 elements (hereinafter, referred to as "vector data"). That is, in a first column of the vector matrix 22, vector data DV1.1-DV32.1 may be arranged from a first row to a $32^{nd}$ row. The MAC result matrix 23 may have 4 elements (hereinafter, referred to as "MAC result data"). That is, in a first column of the MAC result matrix 23, MAC result data MAC_RST1.1-MAC_RST3.1 may be arranged from a first row to a fourth row.

A first MAC operation may be performed in the first MAC unit 110 based on the first weight data DW1.1-DW1.32 and the vector data DV1.1-DV31.1. A second MAC operation may be performed in the second MAC unit 120 based on the second weight data DW2.1-DW2.32 and the vector data DV1.1-DV31.1. A third MAC operation may be performed in the third MAC unit 130 based on the third weight data DW3.1-DW3.32 and the vector data DV1.1-DV31.1. A fourth MAC operation may be performed in the fourth MAC unit 140 based on the fourth weight data DW4.1-DW4.32 and the vector data DV1.1-DV31.1. In order to perform the first to fourth MAC operations, the first memory bank BK0 may store the first weight data DW1.1-DW1.32. The second memory bank BK1 may store the second weight data DW2.1-DW2.32. The third memory bank BK2 may store the third weight data DW3.1-DW3.32. The fourth memory bank BK3 may store the fourth weight data DW4.1-DW4.32.

Each of the first to fourth weight data DW1.1-DW1.32, DW2.1-DW2.32, DW3.1-DW3.32, and DW4.1-DW4.32 may be divided into first to fourth sets. The sets may be divided into data sizes that may be performed upon by each of the first to fourth MAC operators MAC0-MAC3 at once. Hereinafter, a case in which the first to fourth MAC operators MAC0-MAC3 perform operations on 8 weight data and 8 vector data at a time will be exemplified. In this case, the first weight data DW1.1-DW1.32 may be divided into a first set DW1.1-DW1.8 from the first column to the eighth column, a second set DW1.9-DW1.16 from the ninth column to the sixteenth column, a third set DW1.17-DW1.24 from the $17^{th}$ column to the $24^{th}$ column, and a fourth set DW1.25-DW1.32 from the $25^{th}$ column to the $32^{nd}$ column. In the same manner, the second weight data DW2.1-DW2.32 may be divided into a first set DW2.1-DW2.8, a second set DW2.9-DW2.16, a third set DW2.17-DW2.24, and a fourth set DW2.25-DW2.32. The third weight data DW3.1-DW3.32 may be divided into a first set DW3.1-DW3.8, a second set DW3.9-DW3.16, a third set DW3.17-DW3.24, and a fourth set DW3.25-DW3.32. The fourth weight data DW4.1-DW4.32 may be divided into a first set DW4.1-DW4.8, a second set DW4.9-DW4.16, a third set DW4.17-DW4.24, and a fourth set DW4.25-DW4.32. The vector data DV1.1-DV32.1 may also be divided into a first set DV1.1-DV8.1 from the first row to the eighth row, a second set DV9.1-DV16.1 from the ninth row to the sixteenth row, a third set DV17.1-DV24.1 from the $17^{th}$ row to the $24^{th}$ row, and a fourth set DV25.1-DV32.1 from the $25^{th}$ row to the $32^{nd}$ row.

The same row address signal may select a row in which the first weight data DW1.1-DW1.32 are stored in the first memory bank BK0, a row in which the second weight data DW2.1-DW2.32 are stored in the second memory bank BK1, a row in which the third weight data DW3.1-DW3.32 are stored in the third memory bank BK2, and a row in which the fourth weight data DW4.1-DW4.32 are stored in the fourth memory bank BK3. The same column address signal may select columns in which the first sets DW1.1-

DW1.8, DW2.1-DW2.8, DW3.1-DW3.8, and DW4.1-DW4.8 of the first to fourth weight data are stored in the first to fourth memory banks BK0-BK3. The column in which the first set of vector data DV1.1-DV8.1 is stored in the global buffer GB may also be selected by the first column address signal. Columns in which the second sets DW1.9-DW1.16, DW2.9-DW2.16, DW3.9-DW3.16, and DW4.9-DW4.16 of the first to fourth weight data in the first to fourth memory banks BK0-BK3 are stored may be selected by the same second column address signal. The column in which the second set of vector data DV9.1-DV16.1 is stored in the global buffer GB may also be selected by the second column address signal. Columns in which the third sets DW1.17-DW1.24, DW2.17-DW2.24, DW3.17-DW3.24, and DW4.17-DW4.24 of the first to fourth weight data in the first to fourth memory banks BK0-BK3 are stored may be selected by the same third column address signal. The column in which the third set of vector data DV17.1-DV24.1 is stored in the global buffer GB may also be selected by the third column address signal. Columns in which the fourth sets DW1.25-DW1.32, DW2.25-DW3.32, DW3.25-DW3.32, and DW4.25-DW4.32 of the first to fourth weight data in the first to fourth memory banks BK0-BK3 are stored may be selected by the same fourth column address signal. The column in which the fourth set of vector data DV25.1-DV32.1 is stored in the global buffer GB may also be selected by the third column address signal.

The first MAC operation in the first MC unit 110 may be performed on the weight data of the first row of the weight matrix 21, that is, the first weight data DW1.1-DW1.32, and the vector data DV1.1-DV32.1 of the vector matrix 22. The first MAC operation may be implemented by sequentially performing first to fourth sub-operations. The first sub-operation of the first MAC operation may be performed on the first set DW1.1-DW1.8 of the first weight data and the first set DV1.1-DV8.1 of the vector data. The second sub-operation of the first MAC operation may be performed on the second set DW1.9-DW1.16 of the first weight data and the second set DV9.1-DV16.1 of the vector data. The third sub-operation of the first MAC operation may be performed on the third set DW1.17-DW1.24 of the first weight data and the third set DV17.1-DV24.1 of the vector data. In addition, the fourth sub-operation of the first MAC operation may be performed on the fourth set DW1.25-DW1.32 of the first weight data and the fourth set DV25.1-DV32.1 of the vector data.

The second MAC operation in the second MAC unit 120 may be performed on the weight data of the second row of the weight matrix 21, that is, the second weight data DW2.1-DW2.32, and the vector data DV1.1-DV32.1 of the vector matrix 22. The second MAC operation may be implemented by sequentially performing first to fourth sub-operations. The first sub-operation of the second MAC operation may be performed on the first set DW2.1-DW2.8 of the second weight data and the first set DV1.1-DV8.1 of the vector data. The second sub-operation of the second MAC operation may be performed on the second set DW2.9-DW2.16 of the second weight data and the second set DV9.1-DV16.1 of the vector data. The third sub-operation of the second MAC operation may be performed on the third set DW2.17-DW2.24 of the second weight data and the third set DV17.1-DV24.1 of the vector data. In addition, the fourth sub-operation of the second MAC operation may be performed on the fourth set DW2.25-DW2.32 of the second weight data and the fourth set DV25.1-DV32.1 of the vector data.

The third MAC operation in the third MAC unit 130 may be performed on the weight data of the third row of the weight matrix 21, that is, the third weight data DW3.1-DW3.32, and the vector data DV1.1-DV32.1 of the vector matrix 22. The third MAC operation may be implemented by sequentially performing first to fourth sub-operations. The first sub-operation of the third MAC operation may be performed on the first set DW3.1-DW3.8 of the third weight data and the first set DV1.1-DV8.1 of the vector data. The second sub-operation of the third MAC operation may be performed on the second set DW3.9-DW3.16 of the third weight data and the second set DV9.1-DV16.1 of the vector data. The third sub-operation of the third MAC operation may be performed on the third set DW3.17-DW3.24 of the third weight data and the third set DV17.1-DV24.1 of the vector data. In addition, the fourth sub-operation of the third MAC operation may be performed on the fourth set DW3.25-DW3.32 of the third weight data and the fourth set DV25.1-DV32.1 of the vector data.

The fourth MAC operation in the fourth MAC unit 140 may be performed on the weight data of the fourth row of the weight matrix 21, that is, the fourth weight data DW4.1-DW4.32, and the vector data DV1.1-DV32.1 of the vector matrix 22. The fourth MAC operation may be implemented by sequentially performing first to fourth sub-operations. The first sub-operation of the fourth MAC operation may be performed on the first set DW4.1-DW4.8 of the fourth weight data and the first set DV1.1-DV8.1 of the vector data. The second sub-operation of the fourth MAC operation may be performed on the second set DW4.9-DW4.16 of the fourth weight data and the second set DV9.1-DV16.1 of the vector data. The third sub-operation of the fourth MAC operation may be performed on the third set DW4.17-DW4.24 of the fourth weight data and the third set DV17.1-DV25.1 of the vector data. In addition, the fourth sub-operation of the fourth MAC operation may be performed on the fourth set DW4.25-DW4.32 of the fourth weight data and the fourth set DV25.1-DV32.1 of the vector data.

Figure 3:
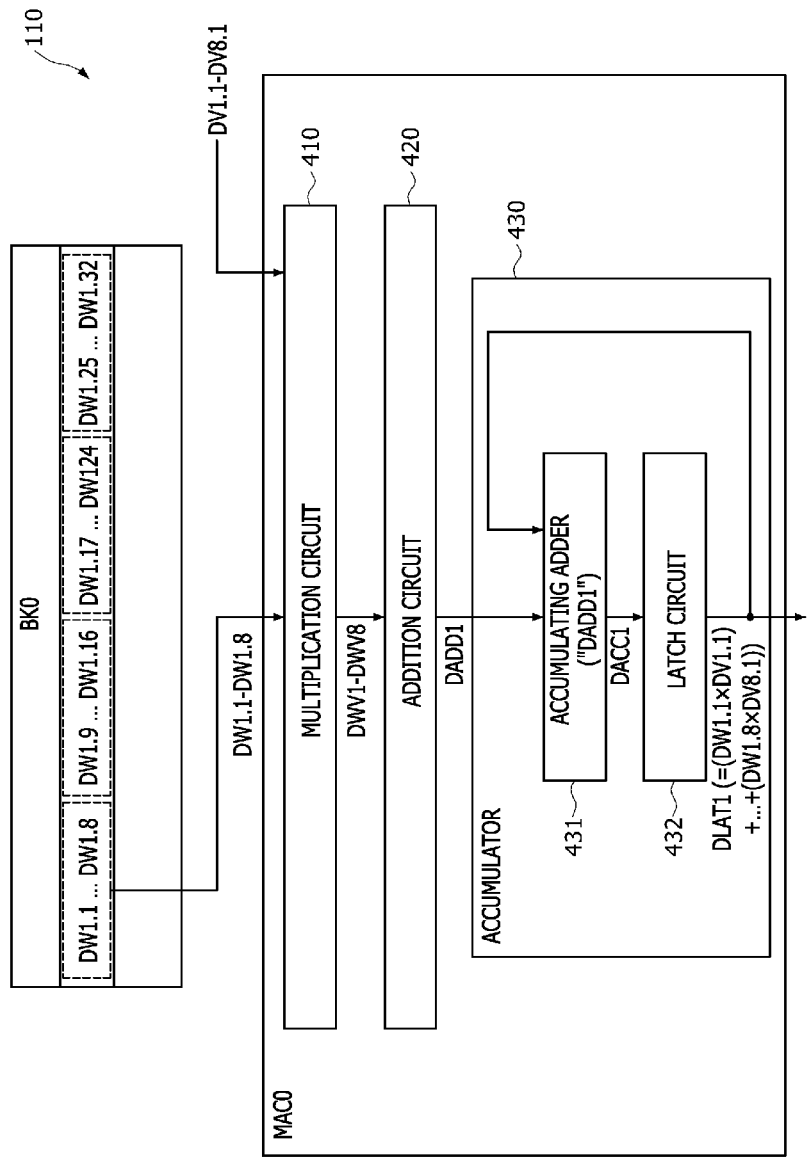
FIGS. 3 to 6 are diagrams illustrating a configuration of a first MAC operator of the PIM device of FIG. 1 and a first MAC operation process in a first MAC unit.

FIGS. 3 to 6 are diagrams illustrating a configuration of the first MAC operator MAC0 of the PIM device 10 of FIG. 1 and the first MAC operation process in the first MAC unit 110. The description of the configuration of the first MAC operator MAC0 in this example may be equally applied to the configuration of each of the second to fourth MAC operators MAC1-MAC3. The description of the first MAC operation process in this example may be equally applied to the second to fourth MAC operation processes in the second to fourth MAC units 120-140. In the all MAC mode, the first to fourth MAC operations in the first to fourth MAC units 110-140 may be performed simultaneously. On the other hand, in the dispersion MAC mode, the first to fourth MAC operations in the first to fourth MAC units 110-140 may be performed in a dispersed manner. In FIGS. 3 to 6, the same reference numerals denote the same components. Referring to FIG. 3, the first MAC operator MAC0 may include a multiplication circuit 410, an addition circuit 420, and an accumulator 430. Although not shown in the drawings, the multiplication circuit 410 may include a plurality of multipliers, for example, 8 multipliers. The addition circuit 420 may be configured as an adder tree in which a plurality of adders are arranged in a tree structure. The accumulator 430 may include an accumulation adder 431 and a latch circuit 432.

In order to perform the first sub-operation of the first MAC operation, the first memory bank BK0 of the first MAC unit 110 may transmit the first set DW1.1-DW1.8 of the first weight data to the multiplication circuit 410 of the first MAC operator MAC0. The global buffer (GB of FIG. 1) may transmit the first set DV1.1-DV8.1 of the vector data to the first to fourth MAC operators MAC0-MAC3, in common. The multiplication circuit 410 of the first MAC unit 110 may perform a multiplication operation on the first set DW1.1-DW1.8 of the first weight data and the first set DV1.1-DV8.1 of the vector data to generate first to eighth multiplication data DWV1-DWV8. The multiplication circuit 410 may transmit the first to eighth multiplication data DWV1-DWV8 to the addition circuit 420. The addition circuit 420 may perform an addition operation on the first to eighth multiplication data DWV1-DWV8 to generate first addition data DADD1. The addition circuit 420 may transmit the first addition data DADD1 to the accumulating adder 431 of the accumulator 430. Because the latch circuit 432 of the first MAC operator MAC0 is in an initialized state, the accumulating adder 431 may output the first addition data DADD1 as the first accumulation data DACC1. The accumulating adder 431 may transmit the first accumulation data DACC1 to the latch circuit 432. The latch circuit 432 may latch the first accumulation data DACC1 to output first latch data DLAT1. The first latch data DLAT1 may be fed into the accumulating adder 431. The first latch data DLAT1 that is generated as a result of the first sub-operation of the first MAC operation may be the result data of an operation "(DW1.1×DV1.1)+ . . . +(DW1.8×DV8.1)".

Figure 4:
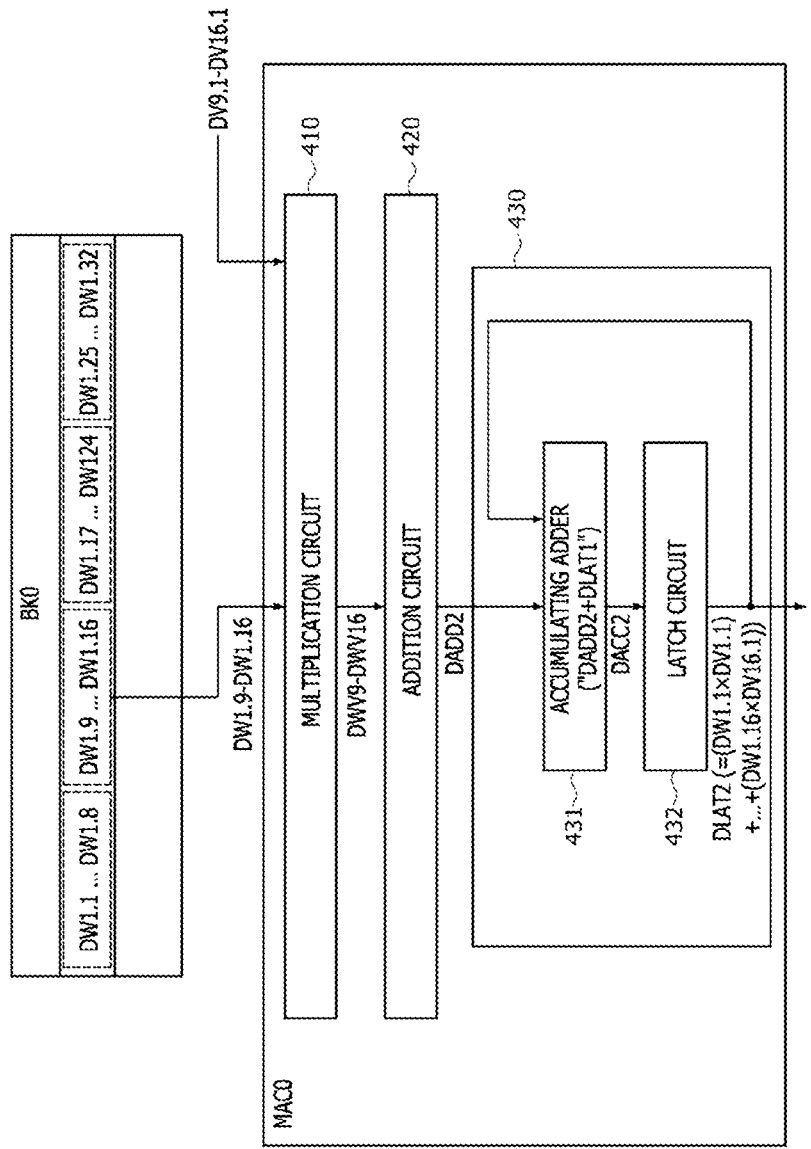

Referring to FIG. 4, in order to perform the second sub-operation of the first MAC operation, the first memory bank BK0 of the first MAC unit 110 may transmit the second set DW1.9-DW1.16 of the first weight data to the multiplication circuit 410 of the first MAC operator MAC0. The global buffer (GB of FIG. 1) may transmit the second set DV9.1-DV16.1 of the vector data to the first to fourth MAC operators MAC0-MAC3 in common. The multiplication circuit 410 of the first MAC unit 110 may perform a multiplication operation on the second set DW1.9-DW1.16 of the first weight data and the second set DV9.1-DV16.1 of the vector data to generate ninth to sixteenth multiplication data DWV9-DWV16. The multiplication circuit 410 may transmit the ninth to sixteenth multiplication data DWV9-DWV16 to the addition circuit 420. The addition circuit 420 may perform an addition operation on the ninth to sixteenth multiplication data DWV9-DWV16 to generate second addition data DADD2. The addition circuit 420 may transmit the second addition data DADD2 to the accumulating adder 431 of the accumulator 430. The accumulating adder 431 may perform an accumulating addition operation on the second addition data DADD2 and the first latch data DLAT1 to output second accumulation data DACC2. The accumulating adder 431 may transmit the second accumulation data DACC2 to the latch circuit 432. The latch circuit 432 may latch the second accumulation data DACC2 to output second latch data DLAT2. The second latch data DLAT2 may be fed into the accumulating adder 431. The second latch data DLAT2 that is generated as a result of the second sub-operation of the first MAC operation may be the result data of the operation "(DW1.1×DV1.1)+ . . . +(DW1.16×DV16.1)".

Figure 5:
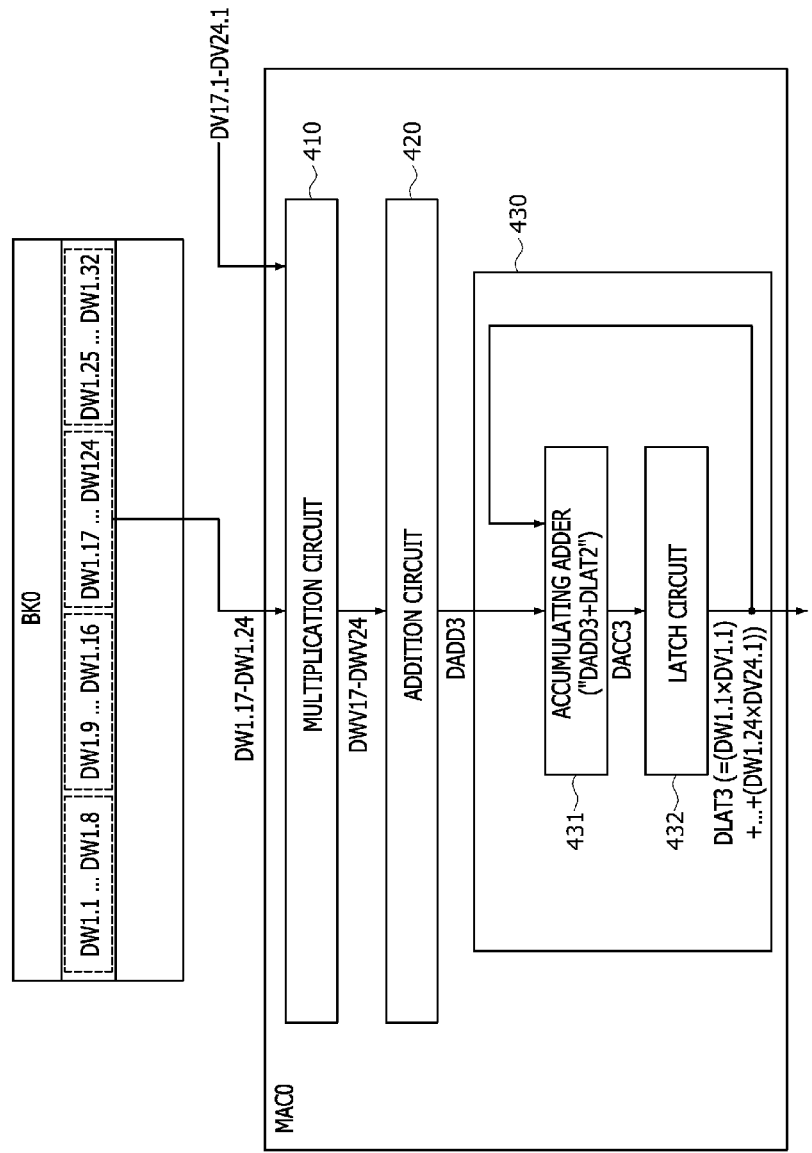

Referring to FIG. 5, in order to perform the third sub-operation of the first MAC operation, the first memory bank BK0 of the first MAC unit 110 may transmit the third set DW1.17-DW1.24 of the first weight data to the multiplication circuit 410 of the first MAC operator MAC0. The global buffer (GB of FIG. 1) may transmit the third set DV17.1-DV24.1 of the vector data to the first to fourth MAC operators MAC0-MAC3 in common. The multiplication circuit 410 of the first MAC unit 110 may perform a multiplication operation on the third set DW1.17-DW1.24 of the first weight data and the third set DV17.1-DV24.1 of the vector data to generate $17^{th}$ to $24^{th}$ multiplication data DWV17-DWV24. The multiplication circuit 410 may transmit the $17^{th}$ to $24^{th}$ multiplication data DWV17-DWV24 to the addition circuit 420. The addition circuit 420 may perform an addition operation on the $17^{th}$ to $24^{th}$ multiplication data DWV17-DWV24 to generate third addition data DADD3. The addition circuit 420 may transmit the third addition data DADD3 to the accumulating adder 431 of the accumulator 430. The accumulating adder 431 may perform an accumulating addition operation on the third addition data DADD3 and the second latch data DLAT2 to generate third accumulation data DACC3. The accumulating adder 431 may transmit the third accumulation data DACC3 to the latch circuit 432. The latch circuit 432 may latch the third accumulation data DACC3 to output third latch data DLAT3. The third latch data DLAT3 may be fed into the accumulating adder 431. The third latch data DLAT3 that is generated as a result of the third sub-operation of the first MAC operation may be the result data of the operation "(DW1.1×DV1.1)+ . . . +(DW1.24×DV24.1)".

Figure 6:
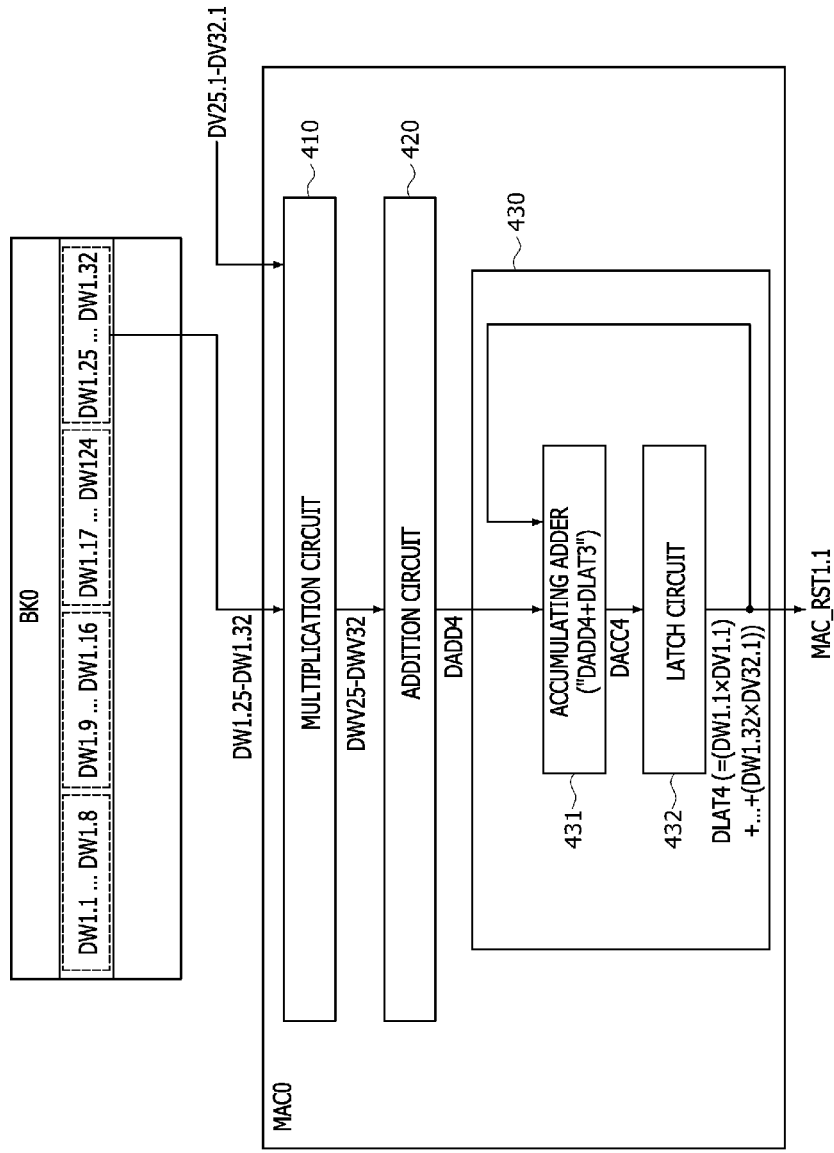

Referring to FIG. 6, in order to perform the fourth sub-operation of the first MAC operation, the first memory bank BK0 of the first MAC unit 110 may transmit the fourth set DW1.25-DW1.32 of the first weight data to the multiplication circuit 410 of the first MAC operator MAC0. The global buffer (GB of FIG. 1) may transmit the fourth set DV25.1-DV32.1 of the vector data to the first to fourth MAC operators MAC0-MAC3 in common. The multiplication circuit 410 of the first MAC unit 110 may perform a multiplication operation on the fourth set DW1.25-DW1.32 of the first weight data and the fourth set DV25.1-DV32.1 of the vector data to generate $25^{th}$ to $32^{nd}$ multiplication data DWV25-DWV32. The multiplication circuit 410 may transmit the $25^{th}$ to $32^{nd}$ multiplication data DWV25-DWV32 to the addition circuit 420. The addition circuit 420 may perform an addition operation on the $25^{th}$ to $32^{nd}$ multiplication data DWV25-DWV32 to generate fourth addition data DADD4. The addition circuit 420 may transmit the fourth addition data DADD4 to the accumulating adder 431 of the accumulator 430. The accumulating adder 431 may perform an accumulating addition operation on the fourth addition data DADD4 and the third latch data DLAT3 to generate fourth accumulation data DACC4. The accumulating adder 431 may transmit the fourth accumulation data DACC4 to the latch circuit 432. The latch circuit 432 may latch the fourth accumulation data DACC4 to output fourth latch data DLAT4. The fourth latch data DLAT4 that is generated as a result of the fourth sub-operation of the first MAC operation may be the result data of the operation "(DW1.1×DV1.1)+ . . . +(DW1.32×DV32.1)". Because the first MAC operation is completed, the first MAC unit 110 may output the fourth latch data DLAT4 as first MAC result data MAC_RST1.1.

Figure 7:
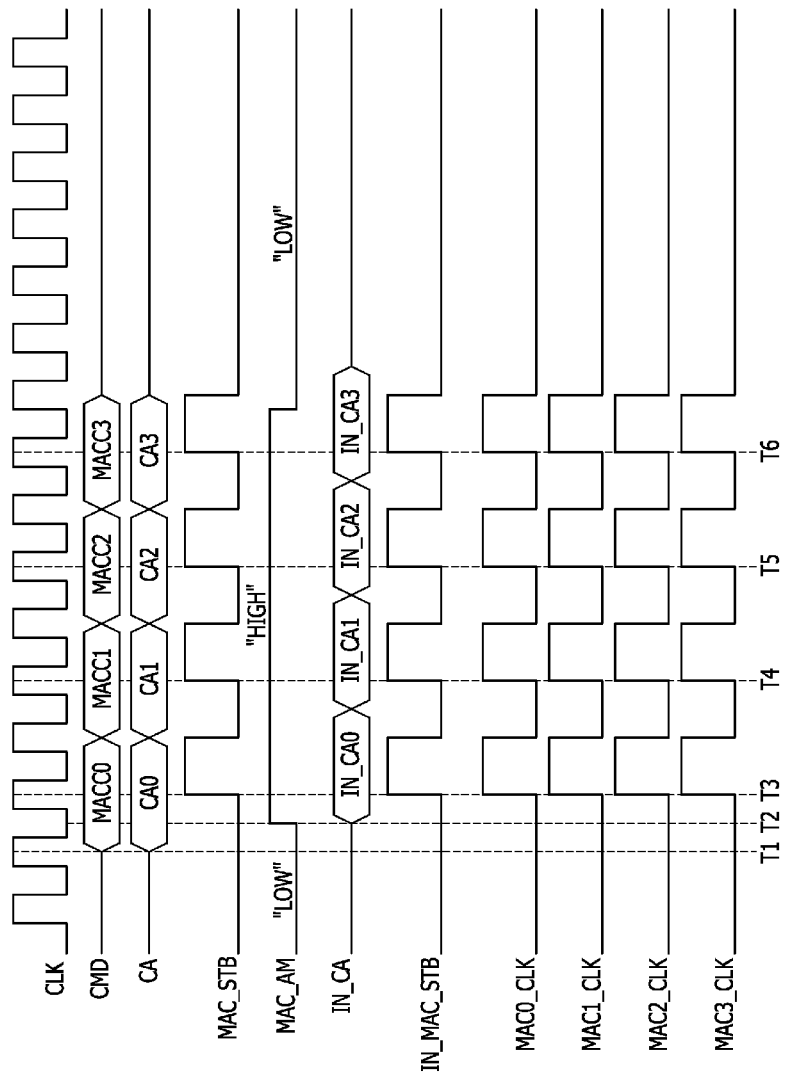
FIG. 7 is a timing diagram illustrating a MAC operation in an all MAC operation mode of the PIM device of FIG. 1.

FIG. 7 is a timing diagram illustrating a MAC operation in an all MAC operation mode of the PIM device 10 of FIG. 1. Hereinafter, a case in which the PIM device 10 of FIG. 1 performs the MAC operation described with reference to FIG. 2 will be exemplified. The term "cycle" may be in reference to a cycle of the reference clock signal CLK unless specified otherwise. Referring to FIG. 7, together with FIG. 1, at a first time point T1, the PIM device 10 may receive a reference clock signal CLK, a command CMD, and a column address signal CA from an external device, for example, a host or a controller. Although not shown in the drawing, in addition to the column address signal CA, a bank address signal may also be transmitted. However, because the MAC operations are simultaneously performed in the first to fourth MAC units 110-140 in the all MAC mode, the bank address signal might not affect the MAC operations. As described with reference to FIG. 2, because each of the first to fourth MAC operations includes first to fourth sub-operations, four commands, that is, first to fourth MAC commands MACCO-MACC3 may be transmitted to the PIM device 10 as the command CMD. In addition, first to fourth column address signals CA0-CA3 may be transmitted to the PIM device 10 as the column address signal CA.

The control circuit 200 of the PIM device 10 may generate an all MAC mode control signal MAC_AM at a logic "high" level at a second time point T2, the second time point T2 being at a predetermined time period, for example, a half cycle after the first time point T1. A MAC strobe signal MAC_STB that is transmitted to the control circuit 200 may have four pulses. The MAC strobe signal MAC_STB may have a cycle that corresponds to two cycles of the reference clock signal CLK that starts at a third time point T3, the third time point T3 being at a predetermined time period, for example, a half cycle after the second time point T2. The all MAC mode control signal MAC_AM may maintain the logic "high" level HIGH while the first to fourth sub-operations of each of the first to fourth MAC operations are being performed. To control the all MAC mode operation, the control circuit 200 of the PIM device 10 may generate and output an internal column address signal IN_CA and an internal MAC strobe signal IN_MAC_STB based on the MAC strobe signal MAC_STB and the all MAC mode control signal MAC_AM. The control circuit 200 may generate and output first to fourth internal column address signals IN_CA0-IN_CA3 as the internal column address signal IN_CA. The first to fourth internal column address signals IN_CA0-IN_CA3 may respectively correspond to the four pulses of the MAC strobe signal MAC_STB. The first to fourth internal column address signals IN_CA0-IN_CA3 may be the same as the first to fourth column address signals CA0-CA3. However, in the embodiment of FIG. 7, the first to fourth column address signals CA0-CA3 may start at the first time point T1 while the first to fourth internal column address signals IN_CA0-IN_CA3 may start at the second time point T2. The internal MAC strobe signal IN_MAC_STB may be the same as the MAC strobe signal MAC_STB, both starting at the same third time point T3 in the embodiment of FIG. 7. The internal MAC strobe signal IN_MAC_STB may be delayed for a predetermined time from the starting of the MAC strobe signal MAC_STB, but this delay will be ignored in several examples below. Although not shown in the drawing, an internal bank address signal IN_BA may be output from the control circuit 200, but the internal bank address signal IN_BA might not affect the MAC operation process in the all MAC mode.

More specifically, at the second time point T2, when the logic level of the all MAC mode control signal MAC_AM is changed from a logic "low" level LOW to a logic "high" level HIGH, the control circuit 200 may generate the internal column address signal IN_CA to transmit the generated internal column address signal IN_CA to the first to fourth memory banks BK0-BK3 and the global buffer GB. In addition, the control circuit 200 may transmit the same internal MAC strobe signal IN_MAC_STB as the MAC strobe signal MAC_STB to the first to fourth memory banks BK0-BK3. As the internal column address signal IN_CA, the first to fourth internal column address signals IN_CA0-IN_CA3 may be respectively output from the control circuit 200 at two-cycle intervals from the second time point T2. The first internal column address signal IN_CA0 may designate columns in which the first sets DW1.1-DW1.8, DW2.1-DW2.8, DW3.1-DW3.8, and DW4.1-DW4.8 of the first to fourth weight data are stored in the first to fourth memory banks BK0-BK3, respectively. The second internal column address signal IN_CA1 may designate columns in which the second sets DW1.9-DW1.16, DW2.9-DW2.16, DW3.9-DW3.16, and DW4.9-DW4.16 of the first to fourth weight data are stored in the first to fourth memory banks BK0-BK3, respectively. The third internal column address signal IN_CA2 may designate columns in which the third sets DW1.17-DW1.24, DW2.17-DW2.24, DW3.17-DW3.24, and DW4.17-DW4.24 of the first to fourth weight data are stored in the first to fourth memory banks BK0-BK3, respectively. In addition, the fourth internal column address signal IN_CA3 may designate columns in which the fourth sets DW1.25-DW1.32, DW2.25-DW2.32, DW3.25-DW3.32, and DW4.25-DW4.32 of the first to fourth weight data are stored in the first to fourth memory banks BK0-BK3, respectively.

The internal MAC strobe signal IN_MAC_STB that is output from the control circuit 200 may have first to fourth pulses having a rising edge at an interval between sub-operations having, for example, a two-cycle interval. For example, the rising edge of the first pulse of the internal MAC strobe signal IN_MAC_STB may be generated at the third time point T3, a half cycle after the second time point T2. The rising edge of the second pulse of the internal MAC strobe signal IN_MAC_STB may be generated at a fourth time point T4, two cycles after the third time point T3. The rising edge of the third pulse of the internal MAC strobe signal IN_MAC_STB may be generated at a fifth time point T5, two cycles after the fourth time point T4. The rising edge of the fourth pulse of the internal MAC strobe signal IN_MAC_STB may be generated at the sixth time point T6, two cycles after the fifth time point T5.

The first to fourth memory banks BK0-BK3 that receive the internal MAC strobe signal IN_MAC_STB may generate first to fourth MAC clock signals MAC0_CLK-MAC3_CLK. Specifically, the first memory bank BK0 may generate the first MAC clock signal MAC0_CLK that is synchronized with the internal MAC strobe signal IN_MAC_STB. The first MAC operation in the first MAC unit 110 may be performed in synchronization with the first MAC clock signal MAC0_CLK. The second memory bank BK1 may generate the second MAC clock signal MAC1_CLK that is synchronized with the internal MAC strobe signal IN_MAC_STB. The second MAC operation in the second MAC unit 120 may be performed in synchronization with the second MAC clock signal MAC1_CLK. The third memory bank BK2 may generate the third MAC clock signal MAC2_CLK that is synchronized with the internal MAC strobe signal IN_MAC_STB. The third MAC operation in the third MAC unit 130 may be performed in synchronization with the third MAC clock signal MAC2_CLK. In addition, the fourth memory bank BK3 may generate the fourth MAC clock signal MAC3_CLK that is synchronized with the internal MAC strobe signal IN_MAC_STB. The fourth MAC operation in the fourth MAC unit 140 may be performed in synchronization with the fourth MAC clock signal MAC3_CLK.

Figure 8:
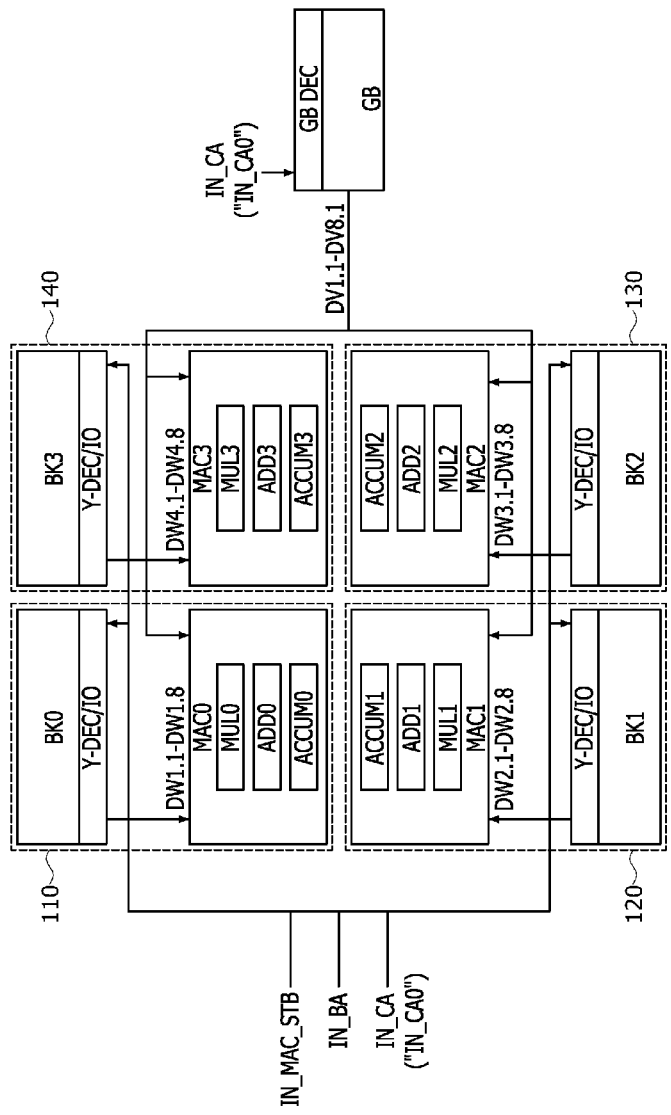
FIG. 8 is a diagram illustrating first sub-operations of first to fourth MAC operations in the all MAC operation mode of the PIM device described with reference to FIG. 7.
Figure 9:
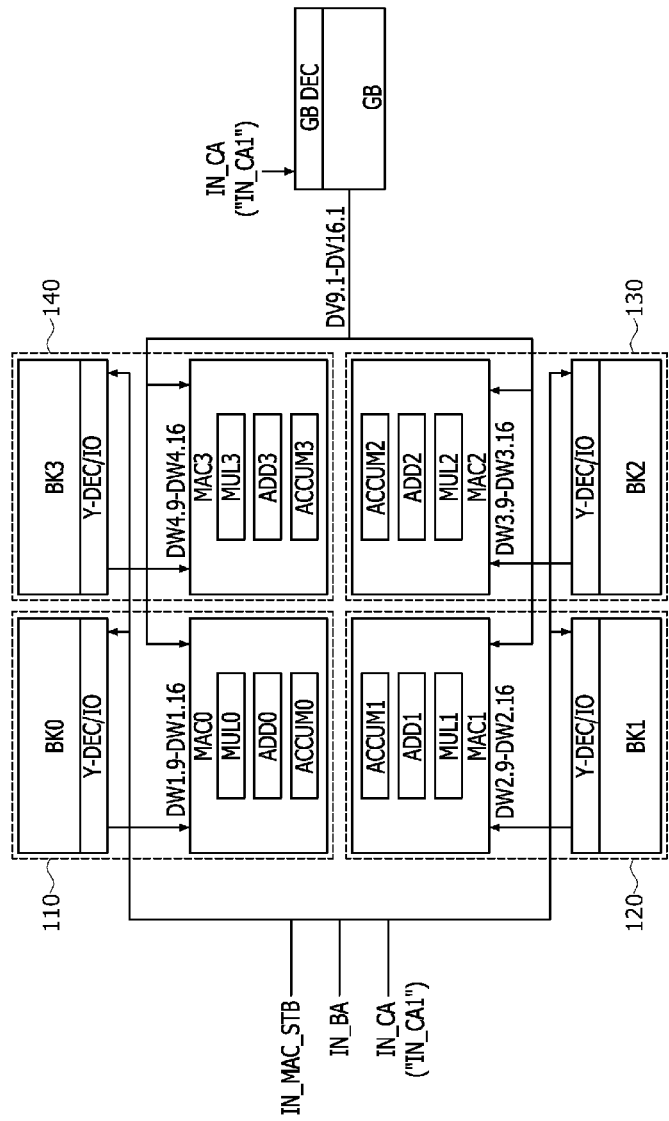
FIG. 9 is a diagram illustrating second sub-operations of the first to fourth MAC operations in the all MAC operation mode of the PIM device described with reference to FIG. 7.
Figure 10:
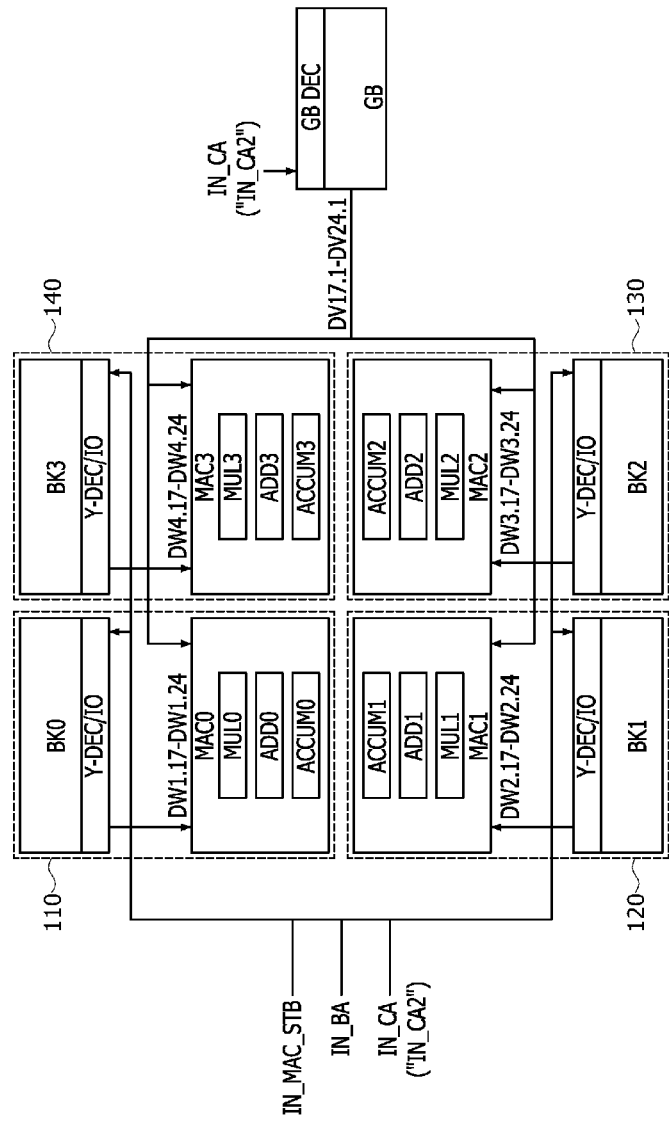
FIG. 10 is a diagram illustrating third sub-operations of the first to fourth MAC operations in the all MAC operation mode of the PIM device described with reference to FIG. 7.
Figure 11:
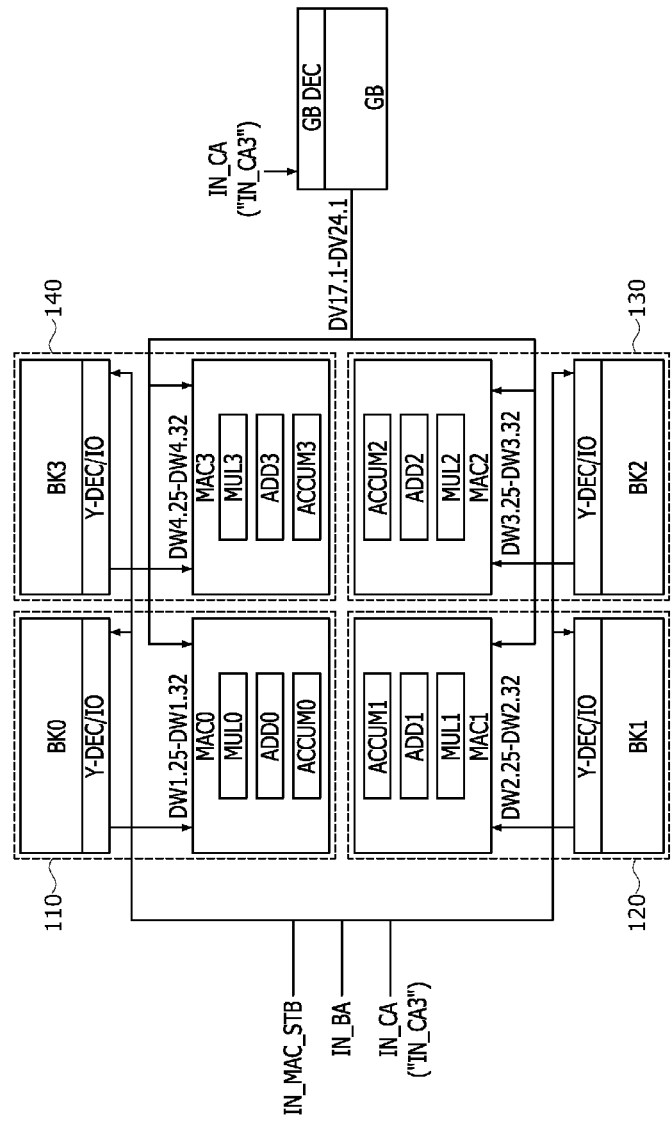
FIG. 11 is a diagram illustrating fourth sub-operations of the first to fourth MAC operations in the all MAC operation mode of the PIM device described with reference to FIG. 7.

FIGS. 8 to 11 are diagrams illustrating a process in which the first to fourth MAC units 110-140 perform the first to fourth MAC operations in the all MAC mode operation of the PIM device 10 described with reference to FIG. 7. Specifically, FIG. 8 is a diagram illustrating the first sub-operations of the first to fourth MAC operations in the all MAC mode. FIG. 9 is a diagram illustrating the second sub-operations of the first to fourth MAC operations in the all MAC mode. FIG. 10 is a diagram illustrating the third sub-operations of the first to fourth MAC operations in the all MAC mode. In addition, FIG. 11 is a diagram illustrating the fourth sub-operations of the first to fourth MAC operations in the all MAC mode. In FIGS. 8 to 11, the same reference numerals denote the same components.

First, referring to FIG. 8, in order to perform the first sub-operations of the first to fourth MAC operations in the all MAC mode, the control circuit (200 of FIG. 1) may transmit an internal MAC strobe signal IN_MAC_STB and a first internal column address signal IN_CA0 to the first to fourth memory banks BK0-BK3. The first internal column address signal IN_CA0 may also be transmitted to the global buffer GB. The global buffer GB may transmit the first set DV1.1-DV8.1 of the vector data that is selected by the first internal column address signal IN_CA0 to the first to fourth MAC operators MAC0-MAC3 of the first to fourth MAC units 110-140. The first memory bank BK0 may transmit the first set DW1.1-DW1.8 of the first weight data that is selected by the first internal column address signal IN_CA0 to the first MAC operator MAC0. The second memory bank BK1 may transmit the first set DW2.1-DW2.8 of the second weight data that is selected by the first internal column address signal IN_CA0 to the second MAC operator MAC1. The third memory bank BK2 may transmit the first set DW3.1-DW3.8 of the third weight data that is selected by the first internal column address signal IN_CA0 to the third MAC operator MAC2. The fourth memory bank BK3 may transmit the first set DW4.1-DW4.8 of the fourth weight data that is selected by the first internal column address signal IN_CA0 to the fourth MAC operator MAC3. The first to fourth MAC operators MAC0-MAC3 may be synchronized with the first pulse of the internal MAC strobe signal IN_MAC_STB to perform the first sub-operations of the first to fourth MAC operations, respectively. The first sub-operation of each of the first to fourth MAC operations may be performed in the same manner as the first sub-operation, described with reference to FIG. 3.

Next, referring to FIG. 9, in order to perform the second sub-operations of the first to fourth MAC operations in the all MAC mode, the control circuit (200 of FIG. 1) may transmit the second internal column address signal IN_CA1 to the first to fourth memory banks BK0-BK3. The second internal column address signal IN_CA1 may also be transmitted to the global buffer GB. The global buffer GB may transmit the second set DV9.1-DV16.1 of the vector data that is selected by the second internal column address signal IN_CA1 to the first to fourth MAC operators MAC0-MAC3 of the first to fourth MAC units 110-140. The first memory bank BK0 may transmit the second set DW1.9-DW1.16 of the first weight data that is selected by the second internal column address signal IN_CA1 to the first MAC operator MAC0. The second memory bank BK1 may transmit the second set DW2.9-DW2.16 of the second weight data that is selected by the second internal column address signal IN_CA1 to the second MAC operator MAC1. The third memory bank BK2 may transmit the first set DW3.9-DW3.16 of the third weight data that is selected by the second internal column address signal IN_CA1 to the third MAC operator MAC2. The fourth memory bank BK3 may transmit the first set DW4.9-DW4.16 of the fourth weight data that is selected by the second internal column address signal IN_CA1 to the fourth MAC operator MAC3. The first to fourth MAC operators MAC0-MAC3 may be synchronized with the second pulse of the internal MAC strobe signal IN_MAC_STB to perform the second sub-operations of the first to fourth MAC operations, respectively. The second sub-operation of each of the first to fourth MAC operations may be performed in the same manner as the second sub-operation described with reference to FIG. 4.

Next, referring to FIG. 10, in order to perform the third sub-operations of the first to fourth MAC operations in the all MAC mode, the control circuit (200 of FIG. 1) may transmit the third internal column address signal IN_CA2 to the first to fourth memory banks BK0-BK3. The third internal column address signal IN_CA2 may also be transmitted to the global buffer GB. The global buffer GB may transmit the third set DV17.1-DV24.1 of the vector data that is selected by the third internal column address signal IN_CA2 to the first to fourth MAC operators MAC0-MAC3 of the first to fourth MAC units 110-140. The first memory bank BK0 may transmit the third set DW1.17-DW1.24 of the first weight data that is selected by the third internal column address signal IN_CA2 to the first MAC operator MAC0. The second memory bank BK1 may transmit the third set DW2.17-DW2.24 of the second weight data that is selected by the third internal column address signal IN_CA2 to the second MAC operator MAC1. The third memory bank BK2 may transmit the third set DW3.17-DW3.24 of the third weight data that is selected by the third internal column address signal IN_CA2 to the third MAC operator MAC2. The fourth memory bank BK3 may transmit the third set DW4.17-DW4.24 of the fourth weight data that is selected by the third internal column address signal IN_CA2 to the fourth MAC operator MAC3. The first to fourth MAC operators MAC0-MAC3 may be synchronized with the third pulse of the internal MAC strobe signal IN_MAC_STB to perform the third sub-operations of the first to fourth MAC operations, respectively. The third sub-operation of each of the first to fourth MAC operations may be performed in the same manner as the third sub-operation described with reference to FIG. 5.

Next, referring to FIG. 11, in order to perform the fourth sub-operations of the first to fourth MAC operations in the all MAC mode, the control circuit (200 of FIG. 1) may transmit the fourth internal column address signal IN_CA3 to the first to fourth memory banks BK0-BK3. The fourth internal column address signal IN_CA3 may also be transmitted to the global buffer GB. The global buffer GB may transmit the fourth set DV25.1-DV32.1 of the vector data that is selected by the fourth internal column address signal IN_CA3 to the first to fourth MAC operators MAC0-MAC3 of the first to fourth MAC units 110-140. The first memory bank BK0 may transmit the fourth set DW1.25-DW1.32 of the first weight data that is selected by the fourth internal column address signal IN_CA3 to the first MAC operator MAC0. The second memory bank BK1 may transmit the fourth set DW2.25-DW2.32 of the second weight data that is selected by the fourth internal column address signal IN_CA3 to the second MAC operator MAC1. The third memory bank BK2 may transmit the fourth set DW3.25-DW3.32 of the third weight data that is selected by the fourth internal column address signal IN_CA3 to the third MAC operator MAC2. The fourth memory bank BK3 may transmit the fourth set DW4.25-DW4.32 of the fourth weight data that is selected by the fourth internal column address signal IN_CA3 to the fourth MAC operator MAC3. The first to fourth MAC operators MAC0-MAC3 may be synchronized with the fourth pulse of the internal MAC strobe signal IN_MAC_STB to perform the third sub-operations of the first to fourth MAC operations, respectively. The fourth sub-operation of each of the first to fourth MAC operations may be performed in the same manner as the fourth sub-operation, described with reference to FIG. 6. As results of the fourth sub-operations of the first to fourth MAC operations, first to fourth MAC result data MAC_RST1.1-MAC_RST4.1 may be output from the first to fourth MAC operators MAC0-MAC3, respectively.

Figure 12:
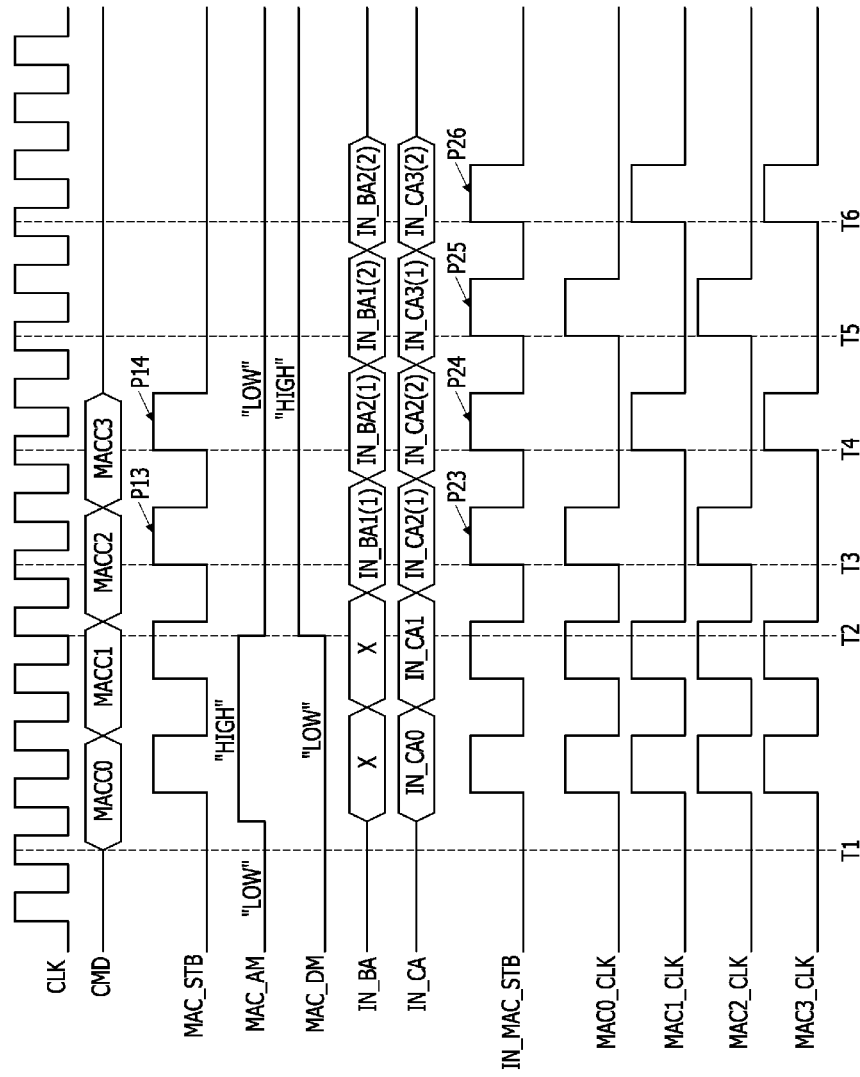
FIG. 12 is a timing diagram illustrating a MAC operation in a dispersion MAC mode of the PIM device of FIG. 1.

FIG. 12 is a timing diagram illustrating an operation in a dispersion MAC mode among the operations of the PIM device 10 of FIG. 1. Referring to FIG. 12, in this embodiment, a case in which the PIM device 10 of FIG. 1 performs the MAC operation, described with reference to FIG. 2, will be exemplified. The term "cycle" may be in reference to a cycle of the reference clock signal CLK unless specified otherwise. As described with reference to FIG. 7, it is assumed that the PIM device 10 receives a reference clock signal CLK, first to fourth MAC commands MACC0-MACC3, and first to fourth column address signals CA0-CA3 from an external device at a first time point T1. In addition, in this embodiment, a case in which the first and second sub-operations, among the first to fourth sub-operations of the first to fourth MAC operations, are performed in the all MAC mode, and the third and fourth sub-operations are performed in the dispersion MAC mode will be taken as an example. Accordingly, at a second time point T2, when the second sub-operation is started and before the third sub-operation is performed, the logic level of the all MAC mode control signal MAC_AM may be changed from a logic "high" level HIGH to a logic "low" level LOW. In the control circuit 200, the logic level of the dispersion MAC mode control signal MAC_DM may be changed from a logic "low" level LOW to a logic "high" level HIGH at the second time point T2. In this embodiment, the first and second sub-operations of the first to fourth MAC operations may be the same as those described with reference to FIGS. 7 to 9, and thus, redundant descriptions will be omitted.

At the second time point T2, when the logic level of the dispersion MAC mode control signal MAC_DM is changed from a logic "low" level LOW to a logic "high" level HIGH, the control circuit (200 of FIG. 1) may perform a control operation for the first to fourth MAC units 110-140 in the dispersion MAC mode. That is, the first to fourth MAC units 110-140 may perform the third and fourth sub-operations in the dispersion MAC mode. The degree to which the MAC units are dispersed in the dispersion MAC mode may be determined by the dispersion rate. The dispersion rate may be preset and stored in the control device 200 or may be set in the control device 200 through an input from an external device. In this embodiment, a case in which the dispersion rate is "2" will be taken as an example. In this case, the MAC operation in the dispersion MAC mode may be dispersed and performed in half of all MAC units compared to the MAC operation in the all MAC mode. For example, as described with reference to FIG. 1, in a case in which the MAC operations in the all MAC mode are simultaneously performed in the four MAC units 110-140, the MAC operations in the dispersion MAC mode may be dispersed and performed in units of two MAC units, among the first to fourth MAC units 110-140.

Specifically, when the logic level of the dispersion MAC mode control signal MAC_DM is changed to a logic "high" level HIGH at the second time point T2, the control circuit (200 of FIG. 1) may generate and output an internal bank address signal IN_BA, an internal column address signal IN_CA, and an internal MAC strobe signal IN_MAC_STB based on a MAC strobe signal MAC_STB. More specifically, the control circuit 200 may sequentially generate a primary-first bank address signal IN_BA1(1), a secondary-first bank address signal IN_BA1(2), a primary-second bank address signal IN_BA2(1), and a secondary-second bank address signal IN_BA2(2) as the internal bank address signal IN_BA to transmit the generated signals to the first to fourth memory banks BK0-BK3. The primary-first bank address signal IN_BA1(1) and the primary-second bank address signal IN_BA2(1) may designate the first and third memory banks BK0 and BK2, respectively. On the other hand, the secondary-first bank address signal IN_BA1(2) and the secondary-second bank address signal IN_BA2(2) may designate the second and fourth memory banks BK1 and BK3, respectively. Accordingly, the third sub-operation and the fourth sub-operation of each of the first to fourth MAC operations may be first dispersedly performed in the first and third MAC units 110 and 130, and then dispersedly performed in the second and fourth MAC units 120 and 140, respectively.

The control circuit (200 of FIG. 1) may generate a primary-third column address signal IN_CA2(1), a secondary-third column address signal IN_CA2(2), a primary-fourth column address signal IN_CA3(1), and a secondary-fourth column address signal IN_CA3(2) to transmit the generated signals to the first to fourth memory banks BK0-BK3. Each of the primary-third column address signal IN_CA2(1) and the secondary-third column address signal IN_CA2(2) may be the same as the third column address signal IN_CA2 designating the columns in which the third sets DW1.17-DW1.24, DW2.17-DW2.24, DW3.17-DW3.24, and DW4.17-DW4.24 of the first to fourth weight data that are used for the third sub-operation are stored. Each of the primary-fourth column address signal IN_CA3(1) and the secondary-fourth column address signal IN_CA3(2) may be the same as the fourth column address signal IN_CA3 designating the columns in which the weight data that is used in the fourth sub-operation, that is, the fourth sets of the first to fourth weight data are stored.

The control circuit (200 of FIG. 1) may generate and output an internal MAC strobe signal IN_MAC_STB having third to sixth pulses P23-P26. The third pulse P23 and the fourth pulse P24 of the internal MAC strobe signal IN_MAC_STB may be generated at the same timings as the third pulse P13 and the fourth pulse P14 of the MAC strobe signal MAC_STB, respectively. Accordingly, the third pulse P23 of the internal MAC strobe signal IN_MAC_STB may be generated at a third time point T3. The fourth pulse P24 of the internal MAC strobe signal IN_MAC_STB may be generated at a fourth time point T4 when a time interval between sub-operations, for example, two cycles after the third time point T3 at which the third pulse P23 is generated. The fifth pulse P25 of the internal MAC strobe signal IN_MAC_STB may be generated at a fifth time point T5, two cycles after the fourth pulse P24. In addition, the sixth pulse P26 of the internal MAC strobe signal IN_MAC_STB may be generated at a sixth time point T6, two cycles after the fifth pulse P25.

The first to fourth memory banks BK0-BK3 that receive the internal MAC strobe signal IN_MAC_STB and the internal bank address signal IN_BA may generate first to fourth MAC clock signals MAC0_CLK-MAC3_CLK. Specifically, the first memory bank BK0 that is designated by the primary and secondary-first internal bank address signals IN_BA1(1) and IN_BA1(2) may generate the first MAC clock signal MAC0_CLK in which pulses are generated at the third time point T3 and the fifth time point T5 and may transmit the generated first MAC clock signal MAC0_CLK to the first MAC operator MAC0. Similarly, the third memory bank BK2 that is designated by the primary and secondary-first internal bank address signals IN_BA1(1) and IN_BA1(2) may generate the third MAC clock signal MAC2_CLK in which pulses are generated at the third time point T3 and the fifth time point T5 and may transmit the generated third MAC clock signal MAC2_CLK to the third MAC operator MAC2. The second memory bank BK1 that is designated by the primary and secondary-second internal bank address signals IN_BA2(1) and IN_BA2(2) may generate the second MAC clock signal MAC1_CLK in which pulses are generated at the fourth time point T4 and the sixth time point T6 and may transmit the generated second MAC clock signal MAC1_CLK to the second MAC operator MAC1. Similarly, the fourth memory bank BK3 that is designated by the primary and secondary-second internal bank address signals IN_BA2(1) and IN_BA2(2) may generate the fourth MAC clock signal MAC3_CLK in which pulses are generated at the fourth time point T4 and the sixth time point T6 and may transmit the generated fourth MAC clock signal MAC3_CLK to the fourth MAC operator MAC3.

The first MAC operator MAC0 of the first MAC unit 110 and the third MAC operator MAC2 of the third MAC unit 130 may perform the third sub-operation and the fourth sub-operation of the first and third MAC operations in synchronization with the first MAC clock signal MAC0_CLK and the third MAC clock signal MAC2_CLK, respectively. The second MAC operator MAC1 of the second MAC unit 120 and the fourth MAC operator MAC3 of the fourth MAC unit 140 may perform the third sub-operation and the fourth sub-operation of the second and fourth MAC operations in synchronization with the second MAC clock signal MAC1_CLK and the fourth MAC clock signal MAC3_CLK, respectively. That is, in the dispersion MAC mode, the third sub-operation of each of the first to fourth MAC operations may be dispersedly performed in the operation that is performed by the first and third MAC units MAC0 and MAC2 at the third time point T3 and the operation that is performed by the second and fourth MAC units MAC1 and MAC3 at the fourth time point T4. Similarly, the fourth sub-operation of each of the first to fourth MAC operations may be dispersedly performed in the operation that is performed by the first and third MAC units MAC0 and MAC2 at the fifth time point T5 and the operation that is performed by the second and fourth MAC units MAC1 and MAC3 at the sixth time point T6.

Figure 13:
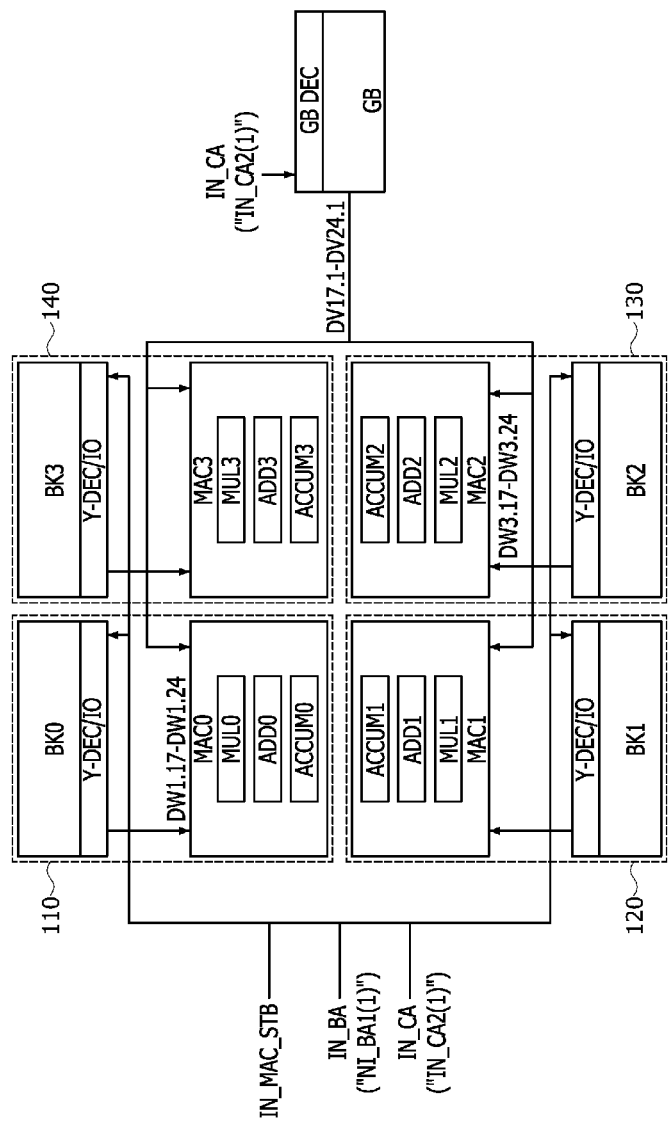
FIGS. 13 and 14 are diagrams illustrating third sub-operations of first to fourth MAC operations in the dispersion MAC mode of the PIM device described with reference to FIG. 12.
Figure 14:
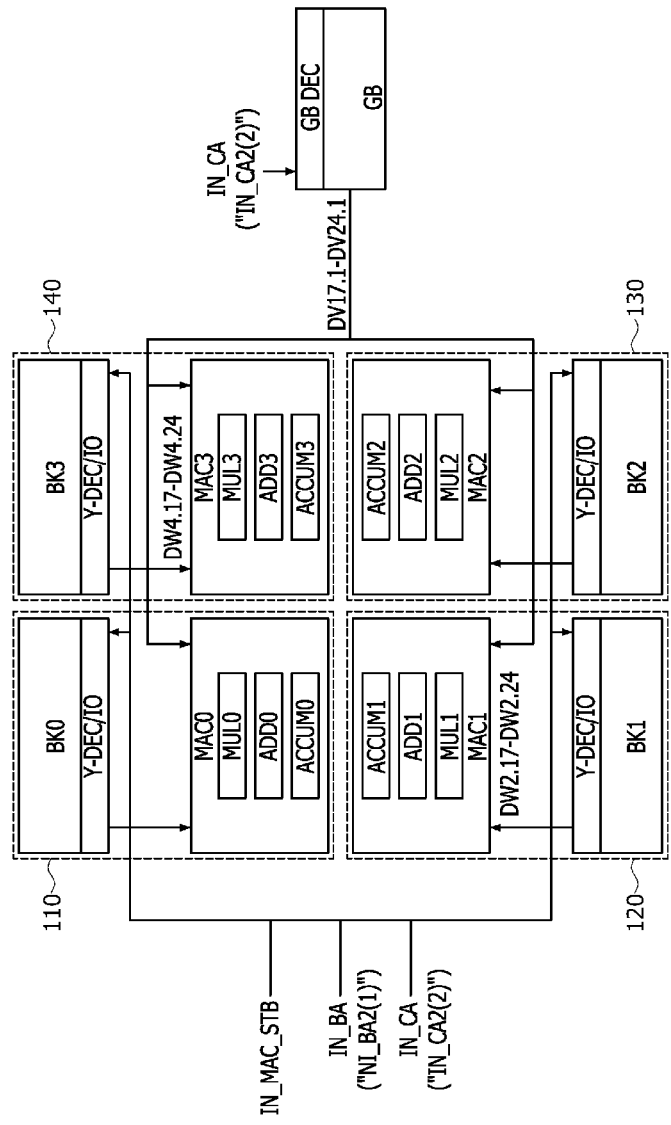
Figure 15:
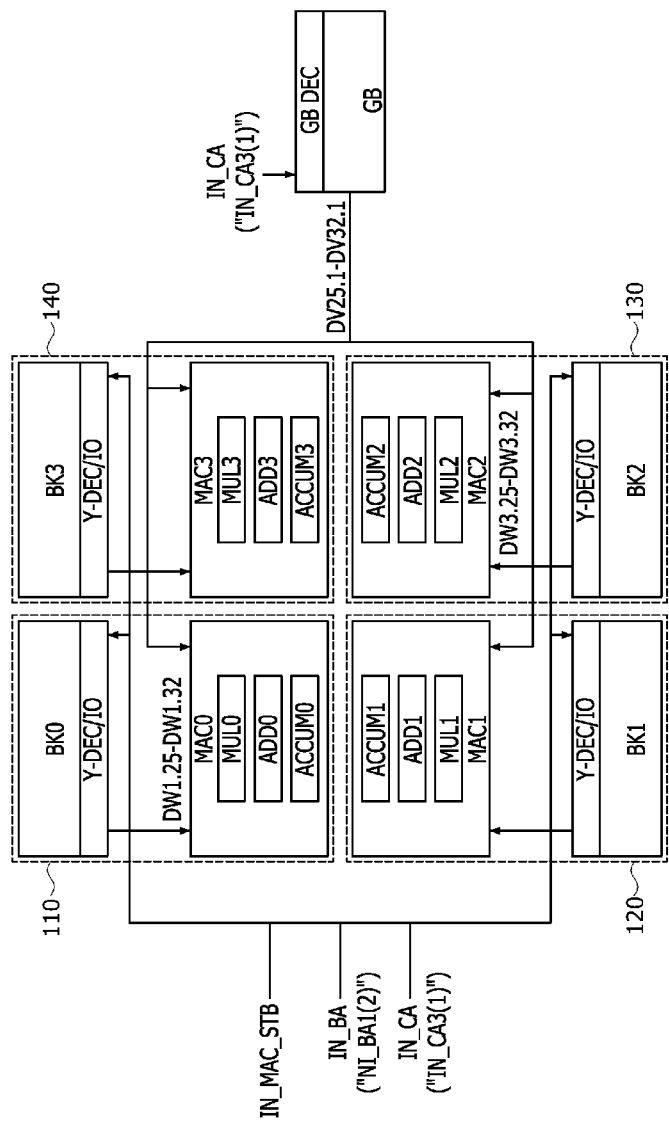
FIGS. 15 and 16 are diagrams illustrating fourth sub-operations of the first to fourth MAC operations in the dispersion MAC mode of the PIM device described with reference to FIG. 12.
Figure 16:
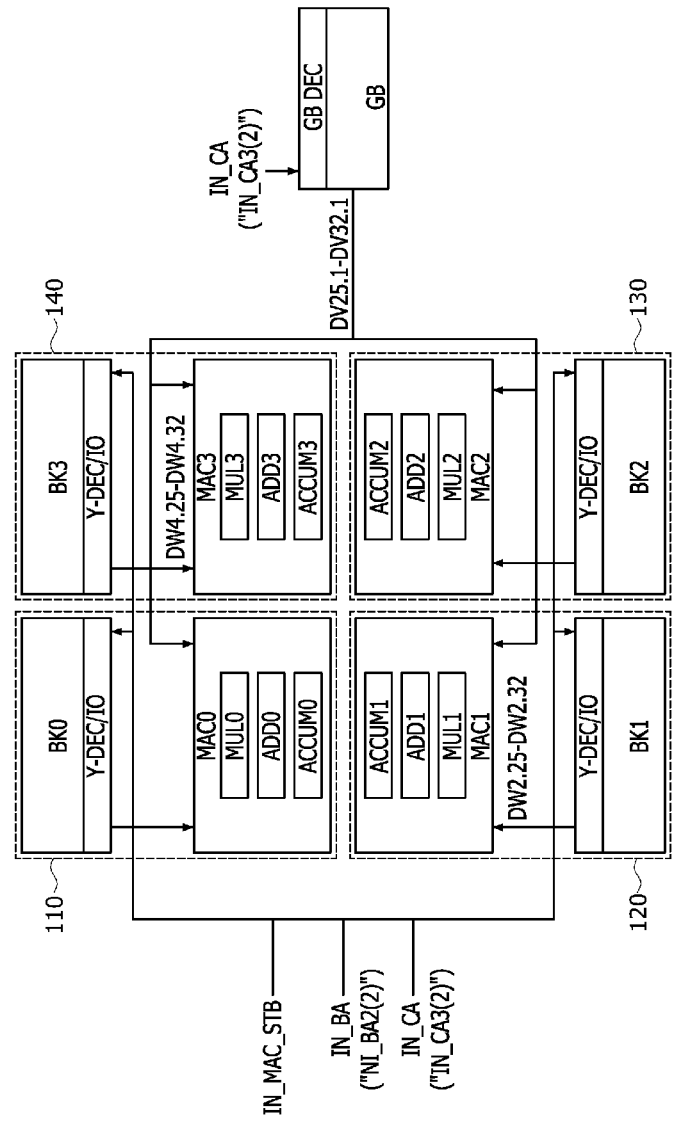

FIGS. 13 to 16 are diagrams illustrating a process in which the first to fourth MAC units 110-140 perform the third and fourth sub-operations of the first to fourth MAC operations in the dispersion MAC mode of the PIM device 10, described with reference to FIG. 12. Specifically, FIGS. 13 and 14 are diagrams illustrating the third sub-operations of the first to fourth MAC operations in the dispersion MAC mode, and FIGS. 15 and 16 are diagrams illustrating the fourth sub-operations of the first to fourth MAC operations in the dispersion MAC mode. In FIGS. 13 to 16, the same reference numerals denote the same components.

First, referring to FIG. 13, at the third time point (T3 of FIG. 12) when the third pulse (P23 of FIG. 12) of the internal MAC strobe signal IN_MAC_STB is generated, a pulse of the first MAC clock signal MAC0-CLK and a pulse of the third MAC clock signal MAC2_CLK may be generated in the first MAC unit 110 and the third MAC unit 130, respectively. The first memory bank BK0 may transmit the third set DW1.17-DW1.24 of the first weight data that is selected by the primary-third internal column address signal IN_CA2(1) to the first MAC operator MAC0. The third memory bank BK2 may transmit the third set DW3.17-DW3.24 of the third weight data that is selected by the primary-third internal column address signal IN_CA2(1) to the third MAC operator MAC2. The global buffer GB may transmit the third set DV17.1-DV24.1 of the vector data that is selected by the primary-third internal column address signal IN_CA2(1) to the first to fourth MAC operators MAC0-MAC3. The transmission of the weight data from the second memory bank BK1 to the second MAC unit MAC1 and the transmission of the weight data from the fourth memory bank BK3 to the fourth MAC unit MAC3 might not be performed. The first MAC operator MAC0 and the third MAC operator MAC2 may perform the third sub-operation of the first MAC operation and the third sub-operation of the third MAC operation in synchronization with the first MAC clock signal MAC0-CLK and the third MAC clock signal MAC2_CLK, respectively. The third sub-operation of the first MAC operation and the third sub-operation of the third MAC operation may be performed in the same manner as the third sub-operation, described with reference to FIG. 5.

Next, referring to FIG. 14, at the fourth time point T4 at which the fourth pulse (P24 of FIG. 12) of the internal MAC strobe signal IN_MAC_STB is generated, a pulse of the second MAC clock signal MAC1_CLK and a pulse of the fourth MAC clock signal MAC3_CLK may be generated in the second MAC unit 120 and the fourth MAC unit 140, respectively. The second memory bank BK1 may transmit the third set DW2.17-DW2.24 of the second weight data that is selected by the secondary-third internal column address signal IN_CA2(2) to the second MAC operator MAC1. The fourth memory bank BK3 may transmit the third set DW4.17-DW4.24 of the fourth weight data that is selected by the secondary-third internal column address signal IN_CA2(2) to the fourth MAC operator MAC3. The global buffer GB may transmit the third set DV17.1-DV24.1 of the vector data that is selected by the secondary-third internal column address signal IN_CA2(2) to the first to fourth MAC operators MAC0-MAC3. The transmission of the weight data from the first memory bank BK0 to the first MAC unit MAC0 and the transmission of the weight data from the third memory bank BK2 to the third MAC unit MAC2 might not be performed. The second MAC operator MAC1 and the fourth MAC operator MAC3 may perform the third sub-operation of the second MAC operation and the third sub-operation of the fourth MAC operation in synchronization with the second MAC clock signal MAC1-CLK and the fourth MAC clock signal MAC3_CLK, respectively. The third sub-operation of the second MAC operation and the third sub-operation of the fourth MAC operation may be performed in the same manner as the third sub-operation, described with reference to FIG. 5.

Next, referring to FIG. 15, at the fifth time point (T5 of FIG. 12) at which the fifth pulse (P25 of FIG. 12) of the internal MAC strobe signal IN_MAC_STB is generated, a pulse of the first MAC clock signal MAC0_CLK and a pulse of the third MAC clock signal MAC2_CLK may be generated in the first MAC unit 110 and the third MAC unit 130. The first memory bank BK0 may transmit the fourth set DW1.25-DW1.32 of the first weight data that is selected by the primary-fourth internal column address signal IN_CA3(1) to the first MAC operator MAC0. The third memory bank BK2 may transmit the fourth set DW3.257-DW3.32 of the third weight data that is selected by the primary-fourth internal column address signal IN_CA3(1) to the third MAC operator MAC2. The global buffer GB may transmit the fourth set DV25.1-DV32.1 of the vector data that is selected by the primary-fourth internal column address signal IN_CA3(1) to the first to fourth MAC operators MAC0-MAC3. The transmission of the weight data from the second memory bank BK1 to the second MAC unit MAC1 and the transmission of the weight data from the fourth memory bank BK3 to the fourth MAC unit MAC3 might not be performed. The first MAC operator MAC0 and the third MAC operator MAC2 may perform the fourth sub-operation of the first MAC operation and the fourth sub-operation of the third MAC operation in synchronization with the first MAC clock signal MAC0-CLK and the third MAC clock signal MAC2_CLK, respectively. The fourth sub-operation of the first MAC operation and the fourth sub-operation of the third MAC operation may be performed in the same manner as the third sub-operation, described with reference to FIG. 6.

Next, referring to FIG. 16, at the sixth time point (T6 of FIG. 12) at which the sixth pulse (P26 of FIG. 12) of the internal MAC strobe signal IN_MAC_STB is generated, a pulse of the second MAC clock signal MAC1_CLK and a pulse of the fourth MAC clock signal MAC3_CLK may be generated in the second MAC unit 120 and the fourth MAC unit 140. The second memory bank BK1 may transmit the fourth set DW2.25-DW2.32 of the second weight data that is selected by the secondary-fourth internal column address signal IN_CA3(2) to the second MAC operator MAC1. The fourth memory bank BK3 may transmit the fourth set DW4.25-DW4.32 of the fourth weight data that is selected by the secondary-fourth internal column address signal IN_CA3(2) to the fourth MAC operator MAC3. The global buffer GB may transmit the fourth set DV25.1-DV32.1 of the vector data that is selected by the secondary-fourth internal column address signal IN_CA3(2) to the first to fourth MAC operators MAC0-MAC3. The transmission of the weight data from the first memory bank BK0 to the first MAC unit MAC0 and the transmission of the weight data from the third memory bank BK2 to the third MAC unit MAC2 might not be performed. The second MAC operator MAC1 and the fourth MAC operator MAC3 may perform the fourth sub-operation of the second MAC operation and the fourth sub-operation of the fourth MAC operation in synchronization with the second MAC clock signal MAC1-CLK and the fourth MAC clock signal MAC3_CLK, respectively. The fourth sub-operation of the second MAC operation and the fourth sub-operation of the fourth MAC operation may be performed in the same manner as the fourth sub-operation described with reference to FIG. 6.

Figure 17:
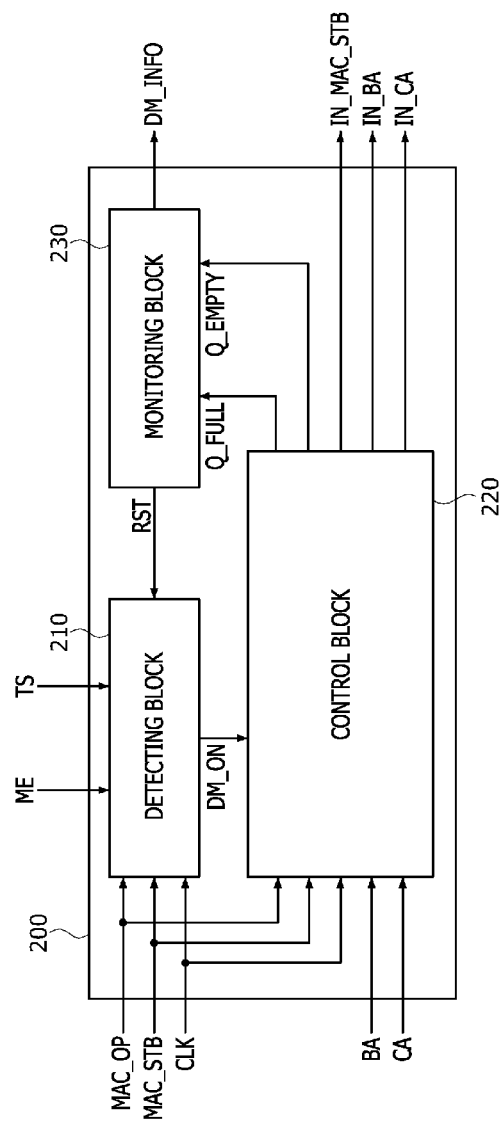
FIG. 17 is a block diagram illustrating an example of a configuration of a control circuit of the PIM device of FIG. 1.

FIG. 17 is a block diagram illustrating an example of a configuration of the control circuit 200 of the PIM device 10 of FIG. 1. Referring to FIG. 17, the control circuit 200 may include a detecting block 210, a control block 220, and a monitoring block 230. The detecting block 210 may receive a MAC control signal MAC_OP, a MAC strobe signal MAC_STB, and a reference clock signal CLK from a command/address decoder (330 of FIG. 1). The detecting block 210 may receive a temperature signal TS and a mode enable signal ME from a temperature detector (310 of FIG. 1) and a mode register (320 of FIG. 1), respectively. The detecting block 210 may receive a reset signal RST from the monitoring block 230. The detecting block 210 may generate a dispersion MAC mode activation signal DM_ON and transmit the generated dispersion MAC mode activation signal DM_ON to the control block 220.

In an embodiment, when the mode enable signal ME is at a logic "low" level, the detecting block 210 may output a dispersion MAC mode activation signal DM_ON at a logic "low" level. In this case, the PIM device 10 may perform the MAC operation only in the all MAC mode. In another embodiment, when the mode enable signal ME is at a logic "high" level, the detecting block 210 may output a dispersion MAC mode activation signal DM_ON at a logic "low" level or a logic "high" level based on the MAC strobe signal MAC_STB and the temperature signal TS. In this case, the PIM device 10 may perform the MAC operation in an operation mode that is determined by the logic level of the dispersion MAC mode activation signal DM_ON between the all MAC mode and the dispersion MAC mode. Hereinafter, a case in which the mode enable signal ME maintains a logic "high" level will be exemplified. When the number of pulses of the MAC strobe signal MAC_STB reaches a setting value and a temperature signal TS at a logic "high" level is transmitted, the detecting block 210 may output a dispersion MAC mode activation signal DM_ON at a logic "high" level. In this case, the PIM device 10 may perform the MAC operation in the dispersion MAC mode. On the other hand, when the number of pulses of the MAC strobe signal MAC_STB does not reach the setting value or a temperature signal TS at a logic "low" level is transmitted, the detecting block 210 may output a dispersion MAC mode activation signal DM_ON at a logic "low" level. In this case, the PIM device 10 may perform the MAC operation in the all MAC mode. When a reset signal RST at a logic "high" level is transmitted from the monitoring block 230 in a state in which the dispersion MAC mode activation signal DM_ON at a logic "high" level is output, the detecting block 210 may change the logic level of the dispersion MAC mode activation signal DM_ON from a logic "high" level to a logic "low" level.

The control block 220 may receive the MAC control signal MAC_OP, the MAC strobe signal MAC_STB, the reference clock signal CLK, a bank address signal BA, and a column address signal CA from the command/address decoder (330 of FIG. 1). The control block 220 may receive the dispersion MAC mode activation signal DM_ON from the detecting block 210. Although not shown in FIG. 17, a queue storage region in which MAC queues that correspond to the MAC control signal MAC_OP are stored may be arranged in the control block 220. The control block 220 may generate a queue-full signal Q_FULL or a Q-empty signal Q_EMPTY based on a state of the queue storage region and transmit the queue-full signal Q_FULL or the Q-empty signal Q_EMPTY to the monitoring block 230. The control block 220 may output a queue-full signal Q_FULL at a logic "high" level when the queue storage region in the control block 220 is filled with MAC queues. The control block 220 may output a queue-empty signal Q_EMPTY at a logic "high" level when the queue storage region in the control block 220 is emptied. The control block 220 may internally generate an all MAC mode control signal MAC_AM and a dispersion MAC mode control signal MAC_DM based on the dispersion MAC mode activation signal DM_ON that is transmitted from the detecting block 210. The control block 220 may generate and output an internal MAC strobe signal IN_MAC_STBM, an internal bank address signal IN_BA, and an internal column address signal IN_CA conforming to the all MAC mode or the dispersion MAC mode, based on the logic levels of the all MAC mode control signal MAC_AM and the dispersion MAC mode control signal MAC_DM. When the dispersion MAC mode activation signal DM_ON is at a logic "low" level, the control block 220 may generate an all MAC mode control signal MAC_AM at a logic "high" level and a dispersion MAC mode control signal MAC_DM at a logic "low" level. In this case, the control block 220 may output the same internal MAC strobe signal IN_MAC_STB as the MAC strobe signal MAC_STB, the same internal bank address signal IN_BA as the bank address signal BA, and the same internal column address signal IN_CA as the column address signal CA. When the dispersion MAC mode activation signal DM_ON is at a logic "low" level, the internal bank address signal IN_BA that is output from the control block 220 might not affect the MAC operation. When the dispersion MAC mode activation signal DM_ON is at a logic "high" level, the control block 220 may generate an all MAC mode control signal MAC_AM at a logic "low" level and a dispersion MAC mode control signal MAC_DM at a logic "high" level. In this case, the control block 220 may output an internal MAC strobe signal IN_MAC_STB with more pulses than the MAC strobe signal MAC_STB, an internal bank address signal IN_BA that dispersedly designates the memory banks, and an internal column address signal IN_CA designating a region in which the weight data is stored in the memory banks.

The monitoring block 230 may receive the queue-full signal Q_FULL and a queue-empty signal Q_EMPTY from the control block 220. The monitoring block 230 may generate the reset signal RST based on the queue-empty signal Q_EMPTY to transmit the generated reset signal RST to the detecting block 210. In an embodiment, when a queue-empty signal Q_EMPTY at a logic "low" level is transmitted, the monitoring block 230 might not generate a pulse of the reset signal RST. In this case, the detecting block 210 might not change the logic level of the dispersion MAC mode activation signal DM_ON. On the other hand, when a queue-empty signal Q_EMPTY at a logic "high" level is transmitted, the monitoring block 230 may generate a pulse of the reset signal RST. In this case, the detecting block 210 may change the logic level of the dispersion MAC mode activation signal DM_ON to a logic "low" level. When a queue-full signal Q_FULL at a logic "high" level is transmitted to the monitoring block 230, the monitoring block 230 may provide dispersion mode information DM_INFO to an external host or a controller to interrupt the MAC command transmission to the PIM device 10. In an embodiment, the dispersion mode information DM_INFO may be output from the monitoring block 230 through a data input/output terminal of the PIM device 10.

Figure 18:
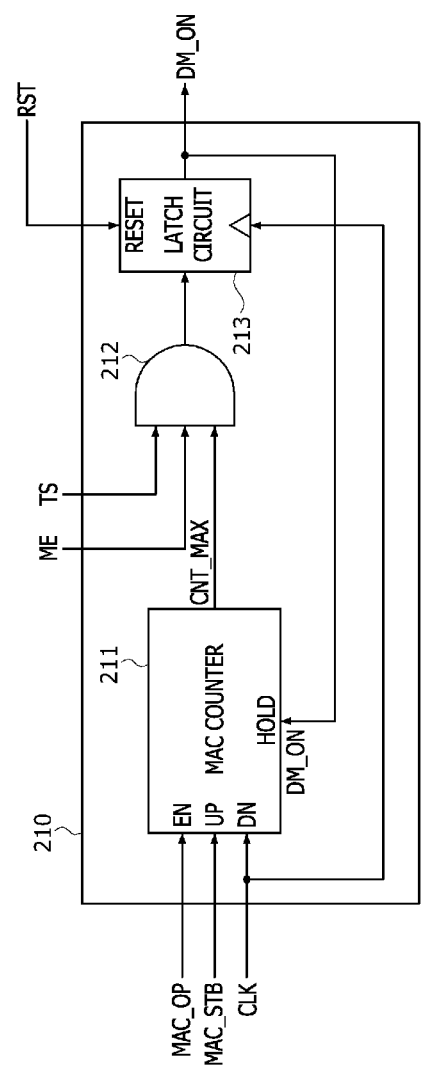
FIG. 18 is a circuit diagram illustrating an example of a configuration of a detecting block of the control circuit of FIG. 17.

FIG. 18 is a block diagram illustrating an example of a configuration of the detecting block 210 of the control circuit 200 of FIG. 17. Referring to FIG. 18, the detecting block 210 of the control circuit 200 may include a MAC counter 211, an AND gate 212, and a latch circuit 213. In an embodiment, the MAC counter 211 may be an up-down counter. In an embodiment, the latch circuit 213 may include a flip-flop. The MAC counter 211 may have an enable terminal EN, an up terminal UP, a down terminal DN, a hold terminal HOLD, and an output terminal. The MAC counter 211 may receive a MAC control signal MAC_OP through the enable terminal EN. The MAC counter 211 may receive a MAC strobe signal MAC_STB through the up terminal UP. The MAC counter 211 may receive a reference clock signal CLK through the down terminal DN. The MAC counter 211 may receive a dispersion MAC mode activation signal DM_ON through the hold terminal HOLD. The MAC counter 211 may output a maximum counting signal CNT_MAX through the output terminal.

The MAC counter 211 may perform a count-up operation on the number of pulses of the MAC strobe signal MAC_STB that corresponds to the MAC control signal MAC_OP. The MAC counter 211 may perform a count-down operation on the reference clock signal CLK while the pulses of the MAC strobe signal MAC_STB are not generated. The counting operation on the reference clock signal CLK may be performed in units of the same cycle as one cycle of the MAC strobe signal MAC_STB, that is, in units of two cycles of the reference clock signal CLK. When a counting value reaches a maximum value while the MAC counter 211 performs the counting-up operation, the MAC counter 211 may output a maximum counting signal CNT_MAX at a logic "high" level. Here, the maximum value may be set as the number of consecutively performed MAC operations that may cause performance degradation of the PIM device 10. When the counting value reaches the maximum value, the MAC counter 211 may maintain the maximum value as the counting value without performing the counting operation for a predetermined time. The MAC counter 211 may resume the counting operation from a time point when the pulse generation in the MAC strobe signal MAC_STB is stopped. When the MAC counter 211 resumes the counting operation, the MAC counter 211 may change the logic level of the maximum counting signal CNT_MAX from a logic "high" level to a logic "low" level. When a dispersion MAC mode activation signal DM_ON at a logic "high" level is transmitted through the hold terminal HOLD while the counting value is maintained at the maximum value, the MAC counter 211 may enter a hold state. When the MAC counter 211 enters the hold state, the counting value of the MAC counter 211 may be maintained at the maximum value, and the logic "high" state of the maximum counting signal CNT_MAX may also be maintained. The MAC counter 211 may maintain the hold state while the dispersion MAC mode activation signal DM_ON is at a logic "high" level. The MAC counter 211 may release the hold state at a time point when the logic level of the dispersion MAC mode activation signal DM_ON becomes a logic "low" level. When the hold state is released, the MAC counter 211 may change the logic level of the maximum counting signal CNT_MAX from a logic "high" level to a logic "low" level.

The AND gate 212 may have three input terminals and one output terminal. The AND gate 212 may receive a temperature signal TS from a temperature detector (310 of FIG. 1) through a first input terminal. The AND gate 212 may receive a mode enable signal ME from a mode register (320 of FIG. 1) through a second input terminal. The AND gate 212 may receive the maximum counting signal CNT_MAX from the MAC counter 211 through a third input terminal. Because it is assumed that the mode enable signal ME maintains a logic "high" state, when the temperature signal TS at a logic "high" level and the maximum counting signal CNT_MAX at a logic "high" level are transmitted, the AND gate 212 may output an output signal at a logic "high" level. The output signal of the AND gate 212 may be transmitted to the latch circuit 213.

The latch circuit 213 may have an input terminal, a clock terminal, a reset terminal RESET, and an output terminal. The latch circuit 213 may receive the output signal output from the AND gate 212 through the input terminal. The latch circuit 213 may receive the reference clock signal CLK through the clock terminal. The latch circuit 213 may receive a reset signal RST that is output from a monitoring block (230 of FIG. 17) through the reset terminal RESET. The latch circuit 213 may latch the output signal from the AND gate 212. The latch circuit 213 may output the latched signal as a dispersion MAC mode activation signal DM_ON through the output terminal in synchronization with the reference clock signal CLK. The latch circuit 213 may transmit the dispersion MAC mode activation signal DM_ON that is output through the output terminal to the hold terminal HOLD of the MAC counter 211. When a reset signal RST at a logic "high" level is input through the reset terminal RESET, the latch circuit 213 may output a dispersion MAC mode activation signal DM_ON that is reset at a logic "low" level.

Figure 19:
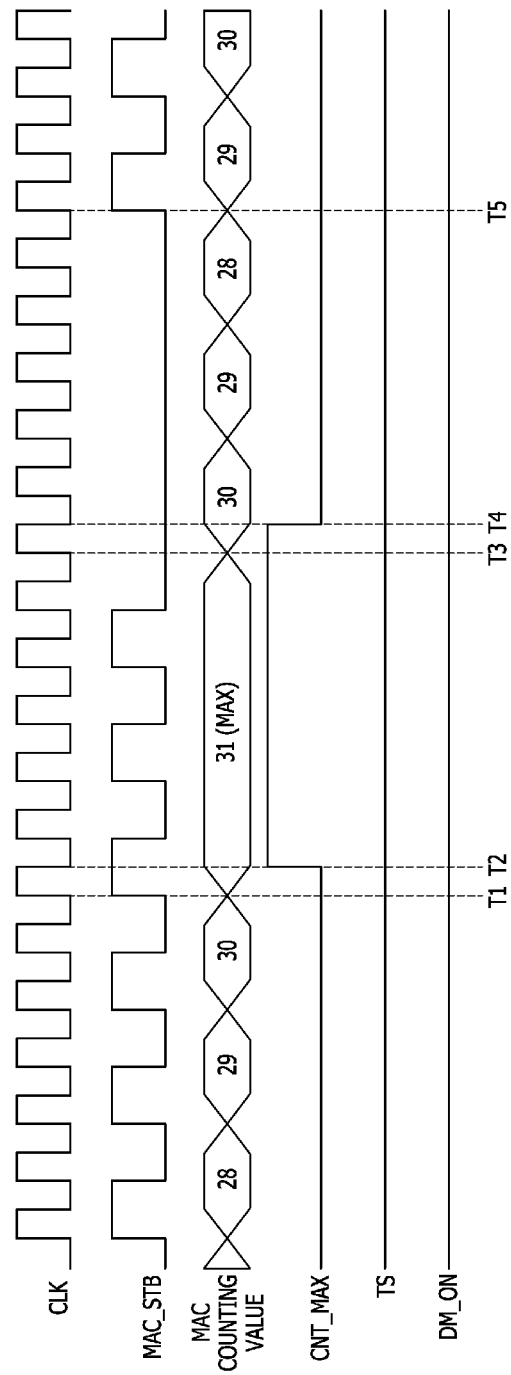
FIG. 19 is a timing diagram illustrating an example of an operation of the detecting block of FIG. 18.

FIG. 19 is a timing diagram illustrating an example of an operation of the detecting block 210 of FIG. 18. In this example, a case in which the maximum value of the MAC counter 211 is set to "31" will be taken as an example. The term "cycle" may be in reference to a cycle of the reference clock signal CLK unless specified otherwise. Referring to FIG. 19, together with FIG. 18, the MAC counter 211 may count the number of pulses of the MAC strobe signal MAC_STB that is transmitted through the up terminal UP. As illustrated in the drawings, the MAC strobe signal MAC_STB may generate 33 pulses until a third time point T3 and may generate two pulses from a fifth time point T5, 6 cycles after the third time point T3. In FIG. 19, first to $27^{th}$ pulses of the MAC strobe signal MAC_STB are omitted. At a first time point T1, when the counting value that is obtained by counting the $31^{st}$ pulse of the MAC strobe signal MAC_STB corresponds to a maximum value, the MAC counter 211 may change the logic level of the maximum counting signal CNT_MAX from a logic "low" level to a logic "high" level at a second time point T2 when a half cycle elapses.

The MAC counter 211 may perform a counting-down operation at the third time point T3 when the generation of the pulse of the MAC strobe signal MAC_STB is stopped. The counting-down operation of the MAC counter 211 may be performed in units of two cycles of the reference clock signal CLK that corresponds to one cycle of the MAC strobe signal MAC_STB. At a fourth time point T4, which is a half cycle after the third time point T3, the MAC counter 211 may change the logic level of the maximum counting signal CNT_MAX from a logic "high" level to a logic "low" level. The MAC counter 211 may perform a counting-up operation again from a fifth time point T5 at which the pulse of the MAC strobe signal MAC_STB is generated again. As the temperature signal TS maintains a logic "low" level, the AND gate 212 may generate an output signal at a logic "low" level, and accordingly, the dispersion MAC mode activation signal DM_ON that is output from the latch circuit 213 may also maintain a logic "low" level.

Figure 20:
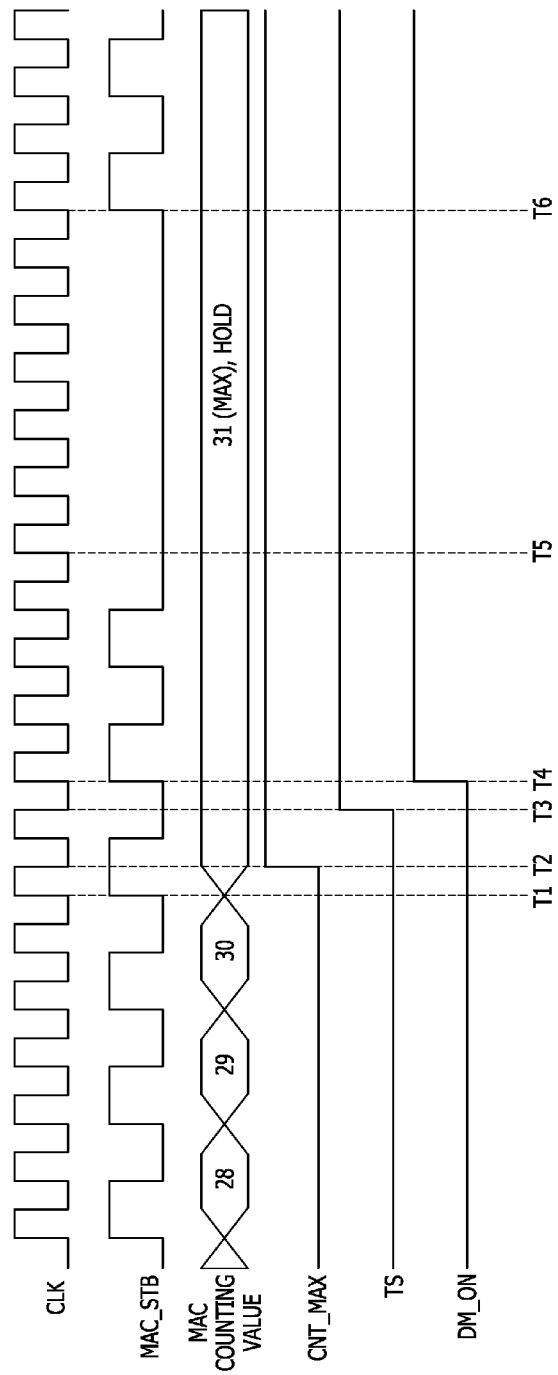
FIG. 20 is a timing diagram illustrating another example of the operation of the detecting block of FIG. 18.

FIG. 20 is a timing diagram illustrating another example of an operation of the detecting block 210 of FIG. 18. In this example, a case in which the maximum value of the MAC counter 211 is set to "31" will be taken as an example. The term "cycle" may be in reference to a cycle of the reference clock signal CLK unless specified otherwise. Referring to FIG. 20, together with FIG. 18, the MAC counter 211 may count the number of pulses of the MAC strobe signal MAC_STB that is transmitted through the up terminal UP. As illustrated in the drawings, the MAC strobe signal MAC_STB may generate 33 pulses until the fifth time point T5 and may generate two pulses from the sixth time point T6, 6 cycles after the fifth time point T5. In FIG. 20, the first to $27^{th}$ pulses of the MAC strobe signal MAC_STB are omitted. At the first time point T1, when the counting value that is obtained by counting the $31^{st}$ pulse of the MAC strobe signal MAC_STB corresponds to the maximum value, the MAC counter 211 may change the logic level of the maximum counting signal CNT_MAX from a logic "low" level to a logic "high" level at the second time point T2 when a half cycle elapses.

At the third time point T3, one cycle after the second time point T2, as the logic level of the temperature signal TS is changed from a logic "low" level to a logic "high" level, the AND gate 212 may transmit an output signal at a logic "high" level to the latch circuit 213. The latch circuit 213 may change the logic level of the dispersion MAC mode activation signal DM_ON from a logic "low" level to a logic "high" level at the fourth time point T4, a half cycle after the third time point T3. The MAC counter 211 may enter a hold state by the dispersion MAC mode activation signal DM_ON at a logic "high" level input through the hold terminal HOLD. Accordingly, the MAC counter 211 might not perform both the counting-up operation and the counting-down operation until the hold state is released. In addition, the maximum counting signal CNT_MAX output from the MAC counter 211 may maintain a logic level at a logic "high" level. The MAC counter 211 may stop the pulse generation of the MAC strobe signal MAC_STB at the fifth time point T5 when the pulse generation of the MAC strobe signal MAC_STB is stopped, but as the dispersion MAC mode activation signal DM_ON maintains a logic "high" level, the hold state of the MAC counter 211 may be maintained. Accordingly, even if the pulse of the MAC strobe signal MAC_STB is generated again at the sixth time point T6, the MAC counter 211 might not perform the counting operation.

Figure 21:
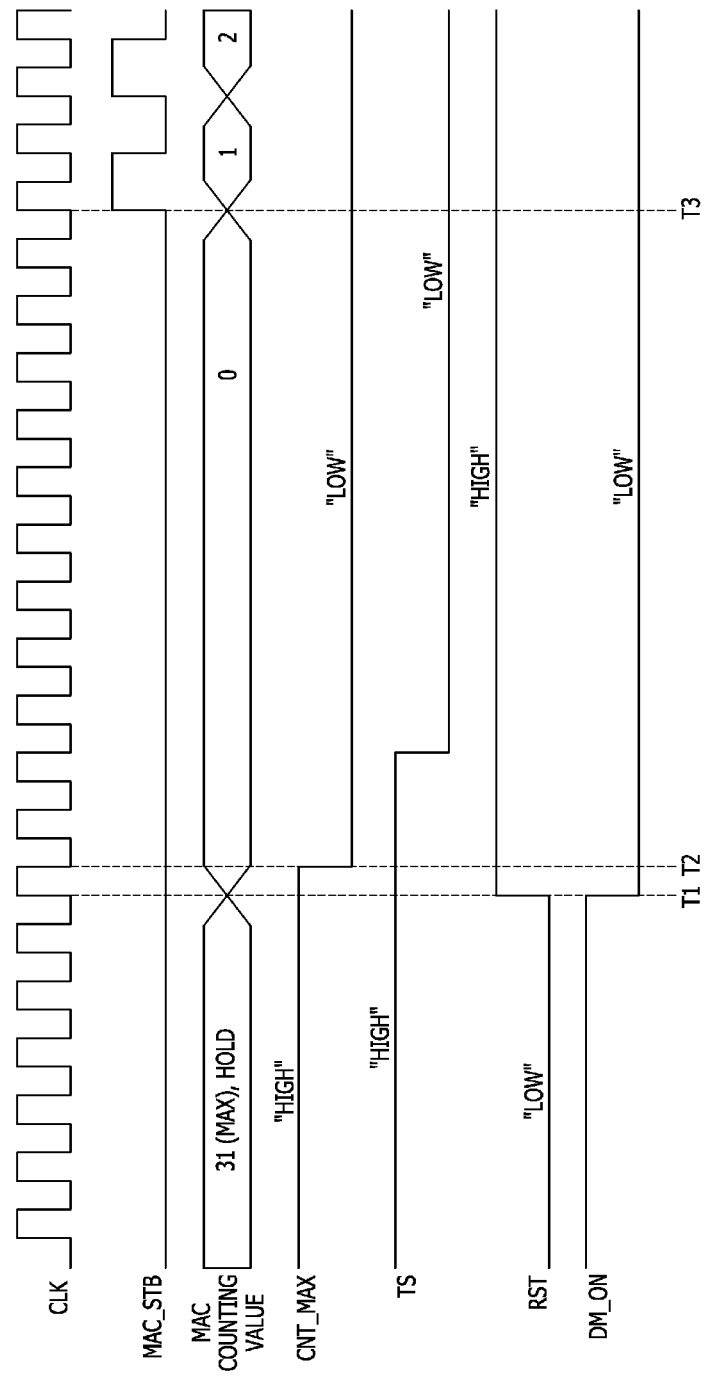
FIG. 21 is a timing diagram illustrating further another example of the operation of the detecting block of FIG. 18.

FIG. 21 is a timing diagram illustrating further another example of an operation of the detecting block 210 of FIG. 18. In this example, it is assumed that the MAC counter 211 of the detecting block 210 maintains a hold state. The term "cycle" may be in reference to a cycle of the reference clock signal CLK unless specified otherwise. Referring to FIG. 21, together with FIG. 18, as illustrated in the drawings, when both the maximum counting signal CNT_MAX and the temperature signal TS maintain logic "high" states, the dispersion MAC mode activation signal DM_ON may also maintain a logic "high" state. In this state, when the logic level of the reset signal RST that is transmitted through the reset terminal RESET of the latch circuit 213 is changed from a logic "low" level to a logic "high" level at the first time point T1, the latch circuit 213 may change the logic level of the dispersion MAC mode activation signal DM_ON from a logic "high" level to a logic "low" level. When the dispersion MAC mode activation signal DM_ON at a logic "low" level is fed into the hold terminal HOLD of the MAC counter 211, the MAC counter 211 may release the hold state. At the second time point T2, a half cycle after the first time point T1, the logic level of the maximum counting signal CNT_MAX may be changed from a logic "high" level to a logic "low" level. Accordingly, from the second time point T2, the latch circuit 213 may output a dispersion MAC mode activation signal DM_ON at a logic "low" level, regardless of the logic level of the temperature signal TS. The MAC counter 211 may restart the counting operation from the third time point T3 when the pulse of the MAC strobe signal MAC_STB is generated.

Figure 22:
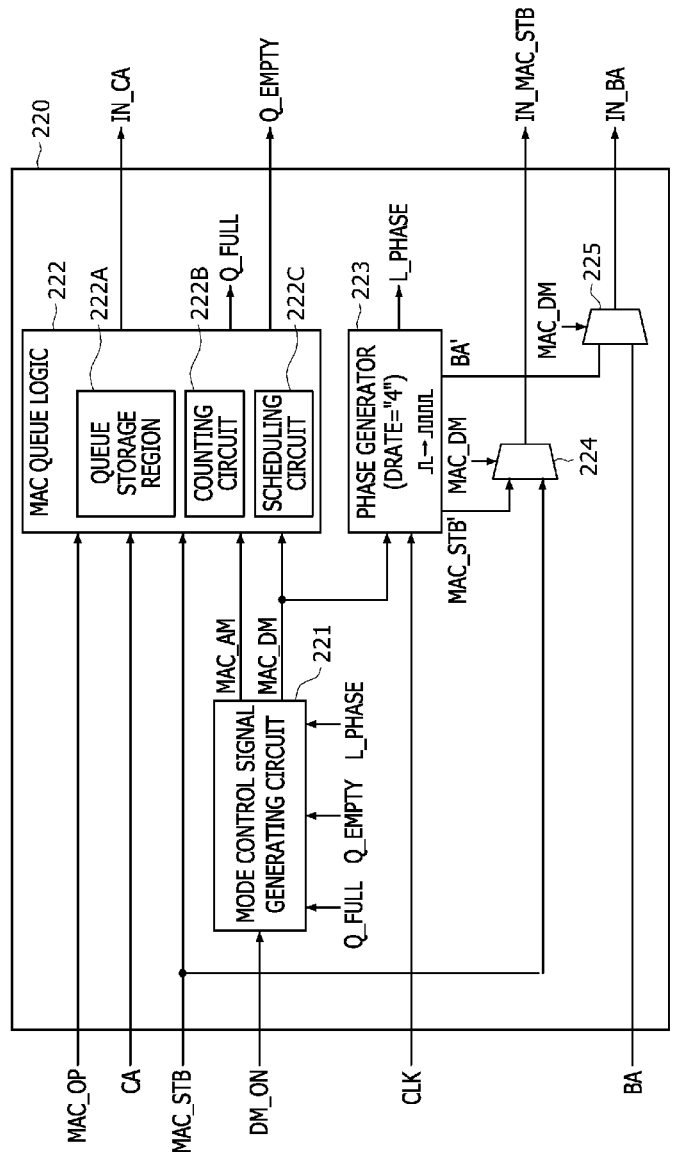
FIG. 22 is a circuit diagram illustrating an example of a configuration of a control block of the control circuit of FIG. 17.
Figure 23:
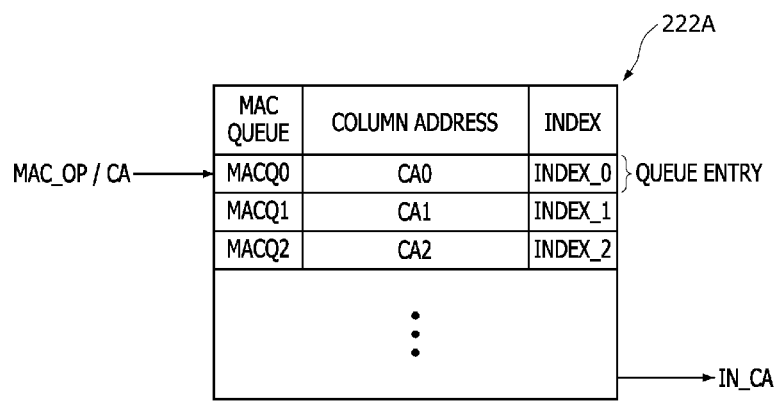
FIG. 23 is a diagram illustrating an example of a configuration of a queue storage region of the control block of FIG. 22.

FIG. 22 is a circuit diagram illustrating an example of a configuration of the control block 220 of the control circuit 200 of FIG. 17. FIG. 23 is a diagram illustrating an example of a configuration of a queue storage region 222A of the control block 220 of FIG. 22. Referring to FIG. 22, the control block 220 of the control circuit 200 may include a mode control signal generating circuit 221, a MAC queue logic 222, a phase generator 223, a first selector 224, and a second selector 225. The MAC queue logic 222 may include the queue storage region 222A, a counting circuit 222B, and a scheduling circuit 222C.

The mode control signal generating circuit 221 may receive the dispersion MAC mode activation signal DM_ON that is output from the detecting block (210 of FIG. 17). In addition, the mode control signal generating circuit 221 may receive a queue-full signal Q_FULL and a queue-empty signal Q_EMPTY that is output from the MAC queue logic 222. In addition, the mode control signal generating circuit 221 may receive a last phase signal L_PHASE from the phase generator 223. The mode control signal generating circuit 221 may generate and output an all MAC mode control signal MAC_AM and a dispersion MAC mode control signal MAC_DM based on the dispersion MAC mode activation signal DM_ON. The mode control signal generating circuit 221 may change the logic level of the all MAC mode control signal MAC_AM and the dispersion MAC mode control signal MAC_DM based on the queue-full signal Q_FULL and the queue-empty signal Q_EMPTY. The mode control signal generating circuit 221 may adjust the logic level change timing of the all MAC mode control signal MAC_AM and the dispersion MAC mode control signal MAC_DM based on the last phase signal L_PHASE. The mode control signal generating circuit 221 may transmit the all MAC mode control signal MAC_AM and the dispersion MAC mode control signal MAC_DM to the MAC queue logic 222 and the phase generator 223. The dispersion MAC mode control signal MAC_DM may also be provided to a selection terminal of the first selector 224 and a selection terminal of the second selector 225. In an embodiment, when the dispersion MAC mode activation signal DM_ON is at a logic "low" level, the mode control signal generating circuit 221 may output an all MAC mode control signal MAC_AM at a logic "high" level and a dispersion MAC mode control signal MAC_DM at a logic "low" level. On the other hand, when the dispersion MAC mode activation signal DM_ON is at a logic "high" level, the mode control signal generating circuit 221 may output an all MAC mode control signal MAC_AM at a logic "low" level and a dispersion MAC mode control signal MAC_DM at a logic "high" level.

When the logic high queue-full signal Q_FULL is transmitted while the dispersion MAC mode activation signal DM_ON is at a logic "high" level, the mode control signal generating circuit 221 may change the logic level of the all MAC mode control signal MAC_AM from a logic "low" level to a logic "high" level and may change the logic level of the dispersion MAC mode control signal MAC_DM from a logic "high" level to a logic "low" level. In this case, the logic level change of the all MAC mode control signal MAC_AM and the dispersion MAC mode control signal MAC_DM may be performed at a timing that is determined by the last phase signal L_PHASE. As such, when a queue-empty signal Q_EMPTY at a logic "high" level is transmitted in a state in which the logic levels of the all MAC mode control signal MAC_AM and the dispersion MAC mode control signal MAC_DM are changed by the queue-full signal Q_FULL, a dispersion MAC mode activation signal DM_ON at a logic "low" level may be transmitted to the mode control signal generating circuit 221, and the logic levels of the all MAC mode control signal MAC_AM and the dispersion MAC mode control signal MAC_DM may be maintained in the logic "high" level and the logic "low" level, respectively. In a state in which the dispersion MAC mode activation signal DM_ON is at a logic "high" state, and accordingly, the logic levels of the all MAC mode control signal MAC_AM and the dispersion MAC mode control signal MAC_DM are a logic "low" level and a logic "high" level, respectively, when a queue-empty Q_EMPTY at a logic "high" level is transmitted, the mode control signal generating circuit 221 may change the logic levels of the all MAC mode control signal MAC_AM and the dispersion MAC mode control signal MAC_DM to a logic "high" level and a logic "low" level, respectively.

The MAC queue logic 222 may receive a MAC control signal MAC_OP, a MAC strobe signal MAC_STB, and a column address signal CA from a command/address decoder (330 of FIG. 1). The MAC queue logic 222 may receive the all MAC mode control signal MAC_AM and the dispersion MAC mode control signal MAC_DM from the mode control signal generating circuit 221. The MAC queue logic 222 may generate and output the queue-full signal Q_FULL, the queue-empty signal Q_EMPTY, and an internal column address signal IN_CA. The MAC queue logic 222 may transmit the queue-full signal Q_FULL and the queue-empty signal Q_EMPTY to the mode control signal generating circuit 221. The MAC queue logic 222 may also transmit the queue-full signal Q_FULL and the queue-empty signal Q_EMPTY to the monitoring block (230 of FIG. 17). The MAC queue logic 222 may transmit the internal column address signal IN_CA to the first to fourth memory banks (BK0-BK3 of FIG. 1) and the global buffer (GB of FIG. 1). The queue storage region 222A of the MAC queue logic 222 may store MAC queues and the column address signal CA that corresponds to the MAC control signal MAC_OP transmitted from the command/address decoder (330 of FIG. 1). The queue storage region 222A may include a plurality of queue entries as shown in FIG. 23. In each of the queue entries, a MAC queue that corresponds to one MAC control signal MAC_OP, a column address signal CA, and an index may be stored. The column address signal CA in the queue entry may designate a region in which weight data and vector data that is used for the MAC operations may be stored. The index in the queue entry may include information regarding the output order and whether the MAC queue that is stored in the queue entry is valid. As illustrated in the drawings, a first column address signal CA0 that is associated with a first MAC queue MACQ0 may be output as the internal column address signal IN_CA from the queue storage region 222A in an order that is determined by a first index INDEX_0. A second column address signal CA1 that is associated with A second MAC queue MACQ1 may be output as the internal column address signal IN_CA from the queue storage region 222A in an order that is determined by a second index INDEX_1. Similarly, a third column address signal CA2 that is associated with a third MAC queue MACQ2 may be output as the internal column address signal IN_CA from the queue storage region 222A in an order that is determined by a third index INDEX_2. The first index INDEX_0 to the third index INDEX_2 may be adjusted by the scheduling circuit 222C in the MAC queue logic 222.

The counting circuit 222B of the MAC queue logic 222 may count the number of MAC queues that are stored in the queue storage region 222A. The counting circuit 222B may transmit a counting value that is generated by the counting operation to the scheduling circuit 222C. The counting circuit 222B may output a queue-full signal Q_FULL at a logic "high" level when the queue storage region 222A is filled with the MAC queues. The counting circuit 222B may output a queue-empty signal Q_EMPTY at a logic "high" level when the queue storage region 222A is empty.

The scheduling circuit 222C of the MAC queue logic 222 may perform a scheduling operation on the storage operation and output operation for the MAC queues in the queue storage region 222A. The scheduling circuit 222C may adjust the indexes of the queue storage region 222A based on the all MAC mode control signal MAC_AM and the dispersion MAC mode control signal MAC_DM that is transmitted from the mode control signal generating circuit 221. In an embodiment, when an all MAC mode control signal MAC_AM at a logic "low" level and a dispersion MAC mode control signal MAC_DM at a logic "high" level are transmitted, the scheduling circuit 222C may adjust the index so that the column address signals that is associated with each of the MAC queues in the queue storage region 222A are continuously and repeatedly output by the number that is determined by the dispersion rate. When an all MAC mode control signal MAC_AM at a logic "high" level and a dispersion MAC mode control signal MAC_DM at a logic "low" level are transmitted in the state of scheduling the MAC queue that is output in the dispersion MAC mode, the scheduling circuit 222C may change the index in the queue entry so that the column address is output in the all MAC mode.

The phase generator 223 of the control block 220 may receive the reference clock signal CLK from the command/address decoder (330 of FIG. 1). The phase generator 223 may receive the dispersion MAC mode control signal MAC_DM from the mode control signal generating circuit 221. The phase generator 223 may generate and output a dispersion MAC strobe signal MAC_STB' in which the number of pulses is increased based on a preset dispersion rate DRATE and a dispersion bank address signal BA' by which the bank designation is dispersed in response to the dispersion MAC mode control signal MAC_DM at a logic "high" level. As illustrated in FIG. 22, when the dispersion rate DRATE is "4", that is, when the MAC operation is set to be dispersedly performed by 4 MAC units in the dispersion MAC mode, the phase generator 223 may output a dispersion MAC strobe signal MAC_STB' in which one pulse of the MAC strobe signal MAC_STB is increased to four pulses. The phase generator 223 may generate and output a dispersion bank address signal BA' that is configured to sequentially designate "N/4" memory bank(s), among "N" memory banks (N is a natural number greater than or equal to 4). In an embodiment, as described with reference to FIG. 1, when the PIM device 10 includes four memory banks BK0-BK3, the dispersion bank address signal BA' may include a first bank address for the first memory bank BK0, a second bank address for the second memory bank BK1, a third bank address for the third memory bank BK2, and a fourth bank address for the fourth memory bank BK3. The phase generator 223 may sequentially output the first to fourth bank addresses in synchronization with the pulses of the dispersion MAC strobe signal MAC_STB'. The phase generator 223 may transmit the last phase signal L_PHASE including the last pulse generation time of the dispersion MAC strobe signal MAC_STB' to the mode control signal generating circuit 221.

The first selector 224 may have a first input terminal, a second input terminal, a selection terminal, and an output terminal. The first selector 224 may receive the dispersion MAC strobe signal MAC_STB' that is output from the phase generator 223 through the first input terminal. The first selector 224 may receive the MAC strobe signal MAC_STB that is output from the command/address decoder (330 of FIG. 1) through the second input terminal. The first selector 224 may receive the dispersion MAC mode control signal MAC_DM through the selection terminal. The first selector 224 may output an internal MAC strobe signal IN_MAC_STB through the output terminal. In an embodiment, when a dispersion MAC mode control signal MAC_DM at a logic "high" level is input through the selection terminal, the first selector 224 may output the dispersion MAC strobe signal MAC_STB' input through the first input terminal as the internal MAC strobe signal IN_MAC_STB. On the other hand, when a dispersion MAC mode control signal MAC_DM at a logic "low" level is input through the selection terminal, the first selector 224 may output the MAC strobe signal MAC_STB input through the second input terminal as the internal MAC strobe signal IN_MAC_STB. Because the dispersion MAC mode control signal MAC_DM and the all MAC mode control signal MAC_AM have a relationship in which their logic levels are toggled, the all MAC mode control signal MAC_AM may be input through the selection terminal. In this case, the first selector 224 may output the dispersion MAC strobe signal MAC_STB' for the all MAC mode control signal MAC_AM at a logic "low" level and may output the MAC strobe signal MAC_STB for the all MAC mode control signal MAC_AM at a logic "high" level.

The second selector 225 may have a first input terminal, a second input terminal, a selection terminal, and an output terminal. The second selector 225 may receive the dispersion bank address signal BA' that is output from the phase generator 223 through the first input terminal. The second selector 225 may receive a bank address signal BA that is output from the command/address decoder (330 of FIG. 1) through the second input terminal. The second selector 225 may receive the dispersion MAC mode control signal MAC_DM through the selection terminal. The second selector 225 may output an internal bank address signal IN_BA through the output terminal. In an embodiment, when a dispersion MAC mode control signal MAC_DM at a logic "high" level is input through the selection terminal, the second selector 225 may output the dispersion bank address signal BA' that is input through the first input terminal as the internal bank address signal IN_BA. On the other hand, when a dispersion MAC mode control signal MAC_DM at a logic "low" level is input through the selection terminal, the second selector 225 may output the bank address signal BA that is input through the second input terminal as the internal bank address signal IN_BA. When the all MAC mode control signal MAC_AM is input through the selection terminal of the second selector 225, the second selector 225 may output the dispersion bank address signal BA' for the all MAC mode control signal MAC_AM of the logic "low" level and may output the bank address signal BA for the all MAC mode control signal MAC_AM of the logic "high" level.

Figure 24:
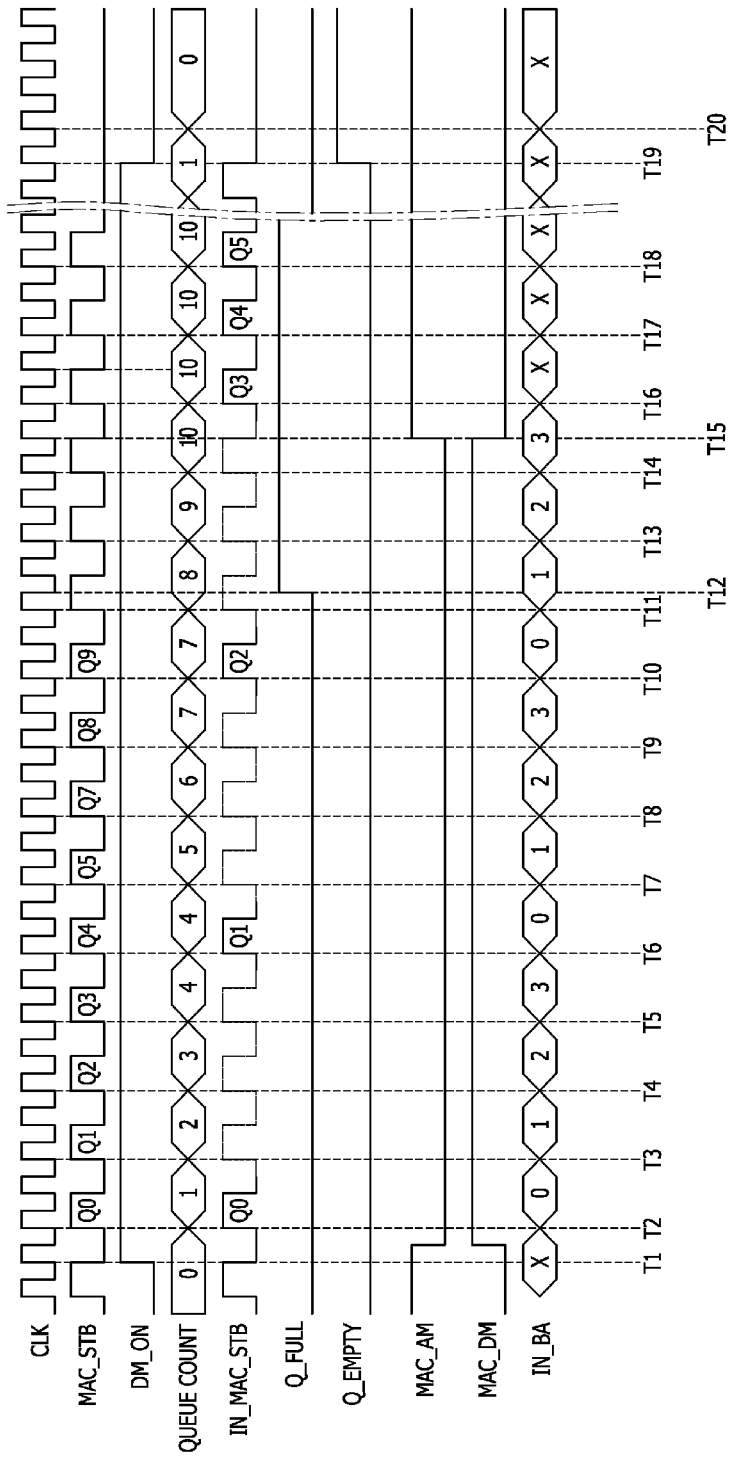
FIG. 24 is a timing diagram illustrating an example of an operation of the control block of FIG. 22.

FIG. 24 is a timing diagram illustrating an example of an operation of the control block 220 of FIG. 22. The timing diagram of FIG. 24 illustrates the operation of the control block 220 when the queue storage region 222A is emptied again after all the MAC queues are filled in the queue storage region 222A of the MAC queue logic 222. In this example, it is assumed that 8 MAC queues may be stored in the queue storage region 222A of the MAC queue logic 222. The term "cycle" may be in reference to a cycle of the reference clock signal CLK unless specified otherwise. Accordingly, when 8 MAC queues are stored in the queue storage region 222A, a queue-full signal Q_FULL at a logic "high" level may be output from the MAC queue logic 222. Referring to FIG. 24 together with FIG. 22, when the logic level of the dispersion MAC mode activation signal DM_ON is changed from a logic "low" level to a logic "high" level at the first time point T1, the mode control signal generating circuit 221 may change the logic levels of the all MAC mode control signal MAC_AM and the dispersion MAC mode control signal MAC_DM to a logic "low" level and a logic "high" level, respectively, a half cycle after the first time point T1. Accordingly, the control block 220 may perform a control operation for the MAC operation in the dispersion MAC mode. From the second time point T2 when the MAC operation in the dispersion MAC mode starts, the MAC queues Q0-Q9 may be sequentially stored in the queue storage region 222A of the MAC queue logic 222 at intervals of one cycle of the MAC strobe signal MAC_STB. The MAC queues Q0-Q9 stored in the queue storage region 222A may be output from the queue storage region 222A in a manner according to the dispersion MAC mode until the dispersion MAC mode is released.

When a dispersion MAC mode control signal MAC_DM at a logic "high" level is transmitted, the phase generator 223 may generate and output the dispersion MAC strobe signal MAC_STB' and the dispersion bank address signal BA' based on the dispersion rate DRATE. As the dispersion rate DRATE is set to "4", the phase generator 223 may generate and output the dispersion MAC strobe signal MAC_STB' having 4 pulses per one pulse of the MAC strobe signal MAC_STB. In addition, the phase generator 223 may generate and output the dispersion bank address signal BA', designating the memory banks that are obtained by dividing the number of memory banks (the same as the number of MAC units) by "4", which is the dispersion rate DRATE. As described with reference to FIG. 1, when the PIM device 10 includes four memory banks BK0-BK3, the phase generator 223 may repeatedly generate and output the dispersion bank address signal BA', designating each of the four memory banks BK0-BK3, in units of four pulses of the dispersion operation strobe signal MAC_STB'. While the dispersion MAC mode control signal MAC_DM at a logic "high" level is transmitted, the phase generator 223 may transmit the last phase signal L_PHASE including the timing of the generation of a pulse that corresponds to the execution of the last MAC operation, among the MAC operations, by one MAC queue Q to the mode control signal generating circuit 221. Accordingly, the last phase signal L_PHASE from the phase generator 223 may be repeated every 4 cycles of the dispersion MAC strobe signal MAC_STB' and may be transmitted to the mode control signal generation circuit 221.

Because the dispersion MAC mode control signal MAC_DM at a logic "high" level is input through the selection terminal of the first selector 224, the first selector 224 may output the dispersion operation strobe signal MAC_STB' that is transmitted from the phase generator 223 as the internal MAC strobe signal IN_MAC_STB. Accordingly, the internal MAC strobe signal IN_MAC_STB may have four pulses for performing the MAC operations by one MAC queue Q. That is, as illustrated in the drawings, the internal MAC strobe signal IN_MAC_STB may have four pulses that are generated at the second time point T2, the third time point T3, the fourth time point T4, and the fifth time point T5, and these four pulses may be applied to perform MAC operations in the dispersion MAC mode by the first MAC queue Q0. In addition, the internal MAC strobe signal IN_MAC_STB may have four pulses that are generated at the sixth time point T6, the seventh time point T7, the eighth time point T8, and the ninth time point T9, and these four pulses may be applied to perform MAC operations in the dispersion MAC mode by the second MAC queue Q1. In addition, the internal MAC strobe signal IN_MAC_STB may have four pulses that are generated at the tenth time point T10, the eleventh time point T11, the thirteenth time point T13, and the fourteenth time point T14, and these four pulses may be applied to perform MAC operations in the dispersion MAC mode by the third MAC queue Q2.

Similarly, because the dispersion MAC mode control signal MAC_DM at a logic "high" level is also input to the selection terminal of the second selector 225, the second selector 225 may output the dispersion bank address signal BA' as the internal bank address signal IN_BA. The internal bank address signal IN_BA may sequentially designate the first to fourth memory banks BK0-BK3 in synchronization with the four pulses in the dispersion MAC mode of the internal operation strobe signal IN_MAC_STB. Accordingly, as illustrated in the drawings, a first bank address signal 0 designating the first memory bank BK0 may be transmitted to the first to fourth memory banks BK0-BK3 as the internal bank address signal IN_BA at the second time point T2. At the third time point T3, a second bank address signal 1 that designates the second memory bank BK1 may be transmitted to the first to fourth memory banks BK0-BK3 as the internal bank address signal IN_BA. At the fourth time point T4, a third bank address signal 2 that designates the third memory bank BK2 may be transmitted to the first to fourth memory banks BK0-BK3 as the internal bank address signal IN_BA. Similarly, at the fifth time point T5, a fourth bank address signal 3 that designates the fourth memory bank BK3 may be transmitted to the first to fourth memory banks BK0-BK3 as the internal bank address signal IN_BA. Such a transmission method of the internal bank address signal IN_BA may be equally applied during the sixth time point T6 to the ninth time point T9 and during the tenth time point T10 to the 14th time point T14.

Meanwhile, as the dispersion MAC mode is started, the queue storage region 222A of the MAC queue logic 222 may output the first MAC queue Q0 at the second time point T2, third time point T3, fourth time point T4, and fifth time point T5, each having a one-cycle interval of the internal MAC strobe signal IN_MAC_STB. At the second time point T2, by the first MAC queue Q0 that is output from the queue storage region 222A, the MAC operation may be performed only in the first MAC unit (110 of FIG. 1), among the first to fourth MAC units (110-140 of FIG. 1), selected by the internal bank address signal IN_BA. At the third time point T3, by the first MAC queue Q0 (indicated by dotted line) that is output from the queue storage region 222A, the MAC operation may be performed only in the second MAC unit (120 of FIG. 1), among the first to fourth MAC units (110-140 of FIG. 1), selected by the internal bank address signal IN_BA. At the fourth time point T4, by the first MAC queue Q0 (indicated by dotted line) output from the queue storage region 222A, the MAC operation may be performed only in the third MAC unit (130 of FIG. 1), among the first to fourth MAC units (110-140 of FIG. 1), selected by the internal bank address signal IN_BA. In addition, at the fifth time point T5, by the first MAC queue Q0 (indicated by dotted line) output from the queue storage region 222A, the MAC operation may be performed only in the fourth MAC unit (140 of FIG. 1), among the first to fourth MAC units (110-140 of FIG. 1), selected by the internal bank address signal IN_BA.

When the MAC operations by the first MAC queue Q0 are finished, the queue storage region 222A of the MAC queue logic 222 may output a second MAC queue Q1 at the sixth time point T6, seventh time point T7, eighth time point T8, and ninth time point T9, each having a one-cycle interval of the internal operation strobe signal IN_MAC_STB. At the sixth time point T6, by the second MAC queue Q1 that is output from the queue storage region 222A, the MAC operation may be performed only in the first MAC unit (110 of FIG. 1), among the first to fourth MAC units (110-140 of FIG. 1), selected by the internal bank address signal IN_BA.

At the seventh time point T7, by the second MAC queue Q1 (indicated by dotted line) that is output from the queue storage region 222A, the MAC operation may be performed only in the second MAC unit (120 of FIG. 1), among the first to fourth MAC units (110-140 of FIG. 1), selected by the internal bank address signal IN_BA. At the eighth time point T8, by the second MAC queue Q1 (indicated by dotted line) that is output from the queue storage region 222A, the MAC operation may be performed only in the third MAC unit (130 of FIG. 1), among the first to fourth MAC units (110-140 of FIG. 1), selected by the internal bank address signal IN_BA. In addition, at the ninth time point T9, by the second MAC queue Q1 (indicated by dotted line) output from the queue storage region 222A, the MAC operation may be performed only in the fourth MAC unit (140 of FIG. 1), among the first to fourth MAC units (110-140 of FIG. 1), selected by the internal bank address signal IN_BA.

When the MAC operations by the second MAC queue Q1 are finished, the queue storage region 222A of the MAC queue logic 222 may output a third MAC queue Q2 at the tenth time point T10, eleventh time point T11, thirteenth time point T13, and fourteenth time point T14, each having a one-cycle interval of the internal operation strobe signal IN_MAC_STB. At the tenth time point T10, by the third MAC queue Q2 that is output from the queue storage region 222A, the MAC operation may be performed only in the first MAC unit (110 of FIG. 1), among the first to fourth MAC units (110-140 of FIG. 1), selected by the internal bank address signal IN_BA. At the eleventh time point T11, by the third MAC queue Q2 (indicated by dotted line) output from the queue storage region 222A, the MAC operation may be performed only in the second MAC unit (120 of FIG. 1), among the first to fourth MAC units (110-140 of FIG. 1), selected by the internal bank address signal IN_BA. At the thirteenth time point T13, by the third MAC queue Q2 (indicated by dotted line) that is output from the queue storage region 222A, the MAC operation may be performed only in the third MAC unit (130 of FIG. 1), among the first to fourth MAC units (110-140 of FIG. 1), selected by the internal bank address signal IN_BA. In addition, at the fourteenth time point T14, by the third MAC queue Q2 (indicated by dotted line) that is output from the queue storage region 222A, the MAC operation may be performed only in the fourth MAC unit (140 of FIG. 1), among the first to fourth MAC units (110-140 of FIG. 1), selected by the internal bank address signal IN_BA.

The counting circuit 222B of the MAC queue logic 222 may perform a counting operation on the MAC queues Q that is output from the queue storage region 222A from the second time point T2 when the MAC operations in the dispersion MAC mode start to be performed. The counting circuit 222B may have a counting value of "4" as a result of the counting operation until the sixth time point T6 when the MAC operations in the dispersion MAC mode by the first MAC queue Q0 are finished. Because the first MAC queue Q0 is already output at the sixth time point T6, the counting circuit 222B may perform a counting operation from the counting value of "4". The counting circuit 222B may have a counting value of "7" as a result of the counting operation until the tenth time point T10 when the MAC operations in the dispersion MAC mode by the second MAC queue Q1 are finished. As the second MAC queue Q1 is output between the sixth time point T6 and the tenth time point T10, the counting circuit 222B may perform a counting operation from the counting value of "7" at the tenth time point T10. The counting circuit 222B may have a counting value of "10" as a result of the counting operation until the sixteenth time point T16 when the MAC operations in the dispersion MAC mode by the third MAC queue Q2 are finished.

At the eleventh time point T11 during which the MAC operations in the dispersion MAC mode are being performed by the third MAC queue Q2, the counting value obtained by the counting operation of the counting circuit 222B may correspond to "8", which is the maximum value. Accordingly, at the twelfth time point T12 when a predetermined time, for example, a half cycle after the eleventh time point T11, the counting circuit 222B may output a queue-full signal Q_FULL at a logic "high" level. As described with reference to FIG. 22, the mode control signal generating circuit 221 that receives the queue-full signal Q_FULL at a logic "high" level may change the logic levels of the all MAC mode control signal MAC_AM and the dispersion MAC mode control signal MAC_DM, respectively, based on the last phase signal L_PHASE that is transmitted from the phase generator 223. As illustrated in the drawings, the last phase signal L_PHASE that is transmitted to the mode control signal generating circuit 221 after the twelfth time point T12 at which the queue-full signal Q_FULL at a logic "high" level is transmitted may include information regarding the timing at which the last pulse, among the pulses of the internal MAC strobe signal IN_MAC_STB for performing the MAC operations in the dispersion MAC mode of the third MAC queue Q2, is generated (that is, the fourteenth time point T14). Accordingly, the mode control signal generating circuit 221 may change the logic levels of the all MAC mode control signal MAC_AM and the dispersion MAC mode control signal MAC_DM to a logic "high" level and a logic "low" level, respectively, at the fifteenth time point T15, one cycle after the fourteenth time point T14.

As the logic levels of the all MAC mode control signal MAC_AM and the dispersion MAC mode control signal MAC_DM are changed to a logic "high" level and a logic "low" level at the fifteenth time point T15, respectively, the MAC queue logic 222 may output the MAC queues in the all MAC mode. Accordingly, the MAC queue logic 222 may output a fourth MAC queue Q3 at a sixteenth time point T16, one cycle after the fifteenth time point T15. Subsequently, the MAC queue logic 222 may output a fifth MAC queue Q4 and a sixth MAC queue Q5 at the seventeenth time point T17 and eighteenth time point T18, each having a one-cycle interval of the internal MAC strobe signal IN_MAC_STB (i.e., a two-cycle interval of the reference clock signal CLK). As the MAC queues are output in the all MAC mode, the counting value in the counting circuit 222B of the MAC queue logic 222 may be maintained at "10". As the dispersion MAC mode control signal MAC_DM at a logic "low" level is input to the selection terminal from the fifteenth time point T15, the first selector 224 may output the MAC strobe signal MAC_STB as the internal MAC strobe signal IN_MAC_STB. Similarly, as the dispersion MAC mode control signal MAC_DM at a logic "low" level is input to the selection terminal from the fifteenth time point T15, the second selector 225 may output a bank address signal BA as the internal bank address signal IN_BA. Although the internal bank address signal IN_BA, such as the bank address signal BA, is output from the second selector 225, because the MAC operations are simultaneously performed in all MAC units in the all MAC mode, the internal bank address signal IN_BA might not affect the MAC operations. In FIG. 24, the internal bank address signal IN_BA in the all MAC mode is marked with "X" in order to distinguish the same from the internal bank address signal IN_BA in the dispersion MAC mode.

In a state in which the MAC operation in the all MAC mode are performed, at the time point at which the last MAC queue is output from the queue storage region 222A of the MAC queue logic 222, that is, at the 19$^{th}$ time point T19 when the counting value of the counting circuit 222B of the MAC queue logic 222 is "1", the counting circuit 222B may output a queue-empty signal Q_EMPTY at a logic "high" level. As described with reference to FIG. 18, a reset signal (RST of FIG. 18) at a logic "high" level may be transmitted to the detecting block (210 of FIG. 18) by the queue-empty signal Q_EMPTY, and accordingly, the logic level of the dispersion MAC mode activation signal DM_ON may be changed from a logic "high" level to a logic "low" level. Even when the dispersion MAC mode activation signal DM_ON at a logic "low" level is transmitted to the mode control signal generating circuit 221, the logic level of the dispersion MAC mode control signal MAC_DM is already in a logic "low" state, so that the logic level of the dispersion MAC mode control signal MAC_DM in the mode control signal generating circuit 221 might not be changed.

Figure 25:
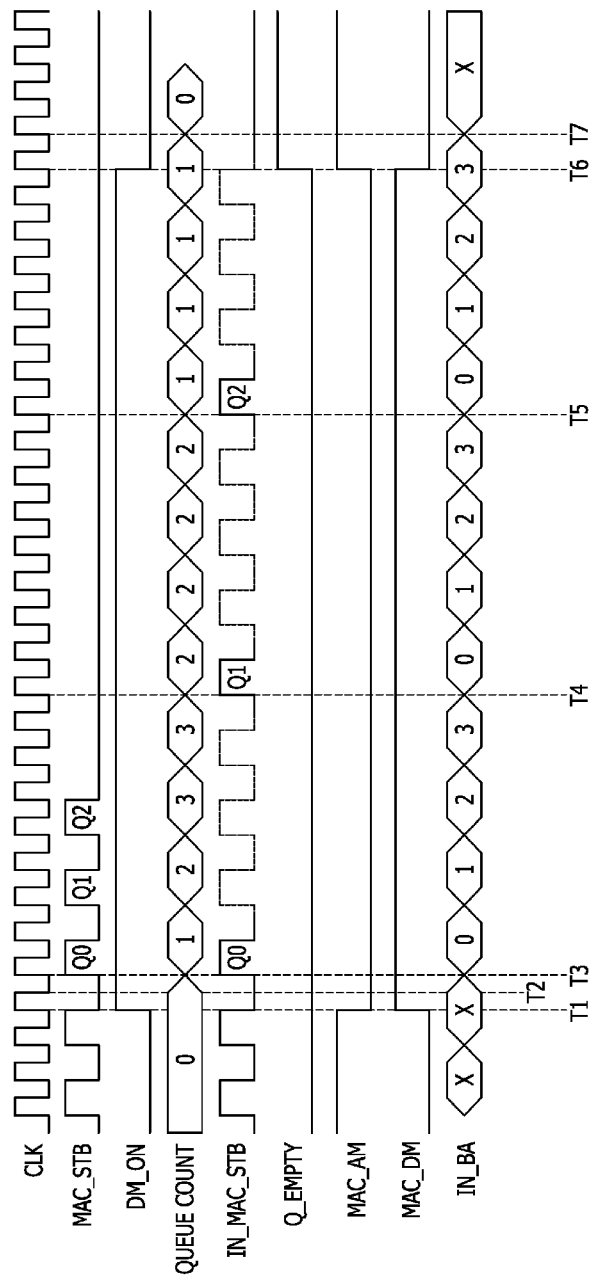
FIG. 25 is a timing diagram illustrating another example of the operation of the control block of FIG. 22.

FIG. 25 is a timing diagram illustrating another example of an operation of the control block 220 of FIG. 22. The timing diagram of FIG. 25 illustrates the operation of the control block 220 when the queue storage region 222A is emptied before all the MAC queues are filled in the queue storage region 222A of the MAC queue logic 222. The term "cycle" may be in reference to a cycle of the reference clock signal CLK unless specified otherwise. Referring to FIG. 25 together with FIG. 22, when the logic level of the dispersion MAC mode control signal MAC_DM is changed from a logic "low" level to a logic "high" level at the first time point T1, at the second time point T2, a half cycle after the first time point T1, the mode control signal generating circuit 221 may change the logic levels of the all MAC mode control signal MAC_AM and the dispersion MAC mode control signal MAC_DM to a logic "low" level and a logic "high" level, respectively. Accordingly, the control block 220 may perform control operations for the MAC operations in the dispersion MAC mode. As illustrated in the drawings, three pulses of the MAC strobe signal MAC_STB may be generated after the second time point T2. Therefore, from the third time point T3, the first MAC queue Q0, the second MAC queue Q1, and the third MAC queue Q2 may be sequentially stored in the queue storage region 222A of the MAC queue logic 222 at periodic intervals of the MAC strobe signal MAC_STB. The first to third MAC queues Q0-Q2 that are stored in the queue storage region 222A may be output from the queue storage region 222A in a manner according to the dispersion MAC mode until the dispersion MAC mode is released.

The operation of the phase generator 223, the operation of the first selector 224, and the operation of the second selector 225 that is performed as the dispersion MAC mode control signal MAC_DM is transmitted may be the same as described above with reference to FIG. 24, and repeated descriptions will be omitted below. Accordingly, the operations of the control block 220 from the third time point T3 to the fourth time point T4 at which the MAC operations in the dispersion MAC mode by the first MAC queue Q0 are performed may be performed in the same manner as the operations of the control block 220 from the second time point (T2 in FIG. 24) to the sixth time point (T6 in FIG. 24) of FIG. 24. The operations of the control block 220 from the fourth time point T4 to the fifth time point T5 at which the MAC operations in the dispersion MAC mode by the second MAC queue Q1 are performed may be performed in the same manner as the operations of the control block 220 from the sixth time point (T6 of FIG. 24) to the tenth time point (T10 of FIG. 24) of FIG. 24. Similarly, the operations of the control block 220 from the fifth time point T5 to the sixth time point T6 at which the MAC operations in the dispersion MAC mode by the third MAC queue Q2 are performed may be performed in the same manner as the operations of the control block 220 from the tenth time point (T10 of FIG. 24) to the sixteenth time point (T16 of FIG. 24) of FIG. 24. However, in this case, the logic level of the queue-full signal Q_FULL may maintain the logic "low" state, and accordingly, the logic levels of the all MAC mode control signal MAC_AM and the dispersion MAC mode control signal MAC_DM might not be changed due to the queue-full signal Q_FULL at a logic "high" level.

In a state where the MAC operations in the all MAC mode are performed, at the sixth time point T6 at which the last quaternary-third MAC queue Q2 is output from the queue storage region 222A of the MAC queue logic 222, and the counting value of the counting circuit 2228 of the MAC Q logic 222 is "1", the counting circuit 2228 may output a queue-empty signal Q_EMPTY at a logic "high" level. As described above with reference to FIG. 18, a reset signal (RST of FIG. 18) at a logic "high" level is transmitted to the detecting block (210 of FIG. 18) by the queue-empty signal Q_EMPTY, and accordingly, the logic level of the dispersion MAC mode activation signal DM_ON may be changed from a logic "high" level to a logic "low" level. As the dispersion MAC mode activation signal DM_ON of the logic "low" level is transmitted to the mode control signal generating circuit 221, the mode control signal generating circuit 221 may change the logic level of the all MAC mode control signal MAC_AM from a logic "low" level to a logic "high" level and may change the logic level of the dispersion MAC mode control signal MAC_DM from a logic "high" level to a logic "low" level.

Figure 26:
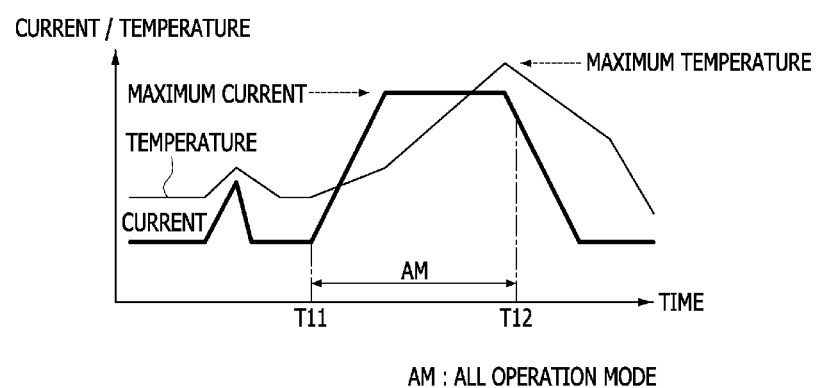
FIG. 26 is a graph illustrating temperature change and current change when the PIM device of FIG. 1 operates in the all MAC mode without the dispersion MAC mode.

FIG. 26 is a graph illustrating changes in temperature and current when the PIM device 10 of FIG. 1 operates in the all MAC mode without the dispersion MAC mode. In FIG. 26, the horizontal axis represents time, and the vertical axis represents current and temperature. Here, the current means the amount of current that is consumed in the PIM device 10, and the temperature means the internal temperature of the PIM device 10. As shown in FIG. 26, in a case in which the MAC operations are performed only in the all MAC mode AM without the dispersion MAC mode from a first time point T11 to a second time point T12, the current may be gradually increased to reach the maximum current, and thereafter, the maximum current state may be maintained for a certain period of time. Accordingly, the temperature may also be increased continuously while the MAC operations are being performed to reach the maximum temperature.

Figure 27:
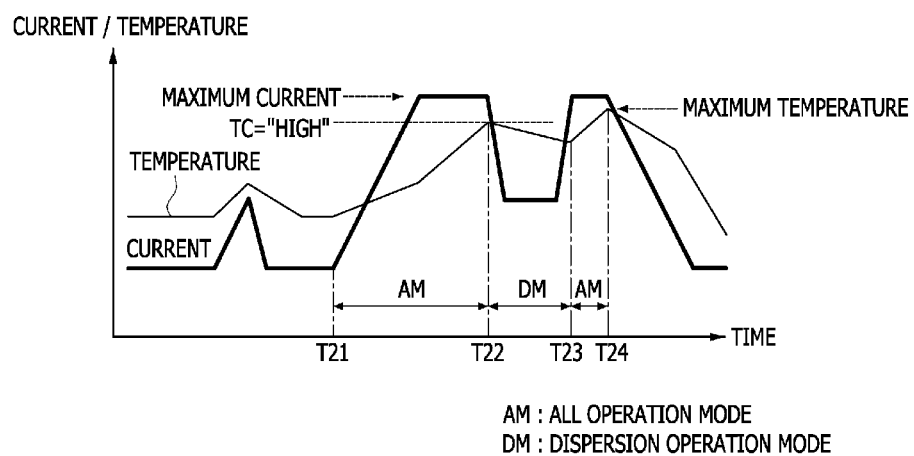
FIG. 27 is a graph illustrating temperature change and current change when the PIM device of FIG. 1 operates in the all MAC mode and the dispersion MAC mode.

FIG. 27 is a graph illustrating changes in temperature and current when the PIM device 10 of FIG. 1 operates in the all MAC mode and the dispersion MAC mode. In FIG. 27, the horizontal axis represents time, and the vertical axis represents current and temperature. Here, the current means the amount of current consumed in the PIM device 10, and the temperature means the internal temperature of the PIM device 10. As shown in FIG. 27, while the PIM device 10 performs the MAC operations in the all MAC mode AM from a first time point T21 to a second time point T22, the current may be gradually increased to reach the maximum current. When the temperature reaches a setting value at the second time point T22 and the temperature signal TS becomes to have a logic "high" level HIGH, the PIM device 10 may perform the MAC operations in the dispersion MAC mode DM from the second time point T22. While the MAC operations are performed in the dispersion MAC mode DM, the current may be rapidly decreased from the maximum current. In this state, when the PIM device 10 performs the MAC operations in the all MAC mode AM again from a third time point T23 to a fourth time point T24, even if the current and temperature increase, the degree of increase might not be high because the current and temperature are already lowered during the dispersion MAC mode DM period.

According to various embodiments, there are provided advantages that current consumption can be lowered by performing the arithmetic operations in the all operation mode and the dispersion operation mode, and thus, the peak temperature can be reduced.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A processing-in-memory (PIM) device comprising:
a plurality of multiplication and accumulation (MAC) units, each of the MAC units including a memory bank and a MAC operator;
a control circuit configured to control the plurality of MAC units to perform an all MAC mode operation in which MAC operations are simultaneously performed in all MAC units, among the plurality of MAC units, and a dispersion MAC mode operation in which the MAC operations are dispersedly performed in some MAC units, among the plurality of MAC units;
a command/address decoder configured to receive a MAC command and an address signal and configured to generate a MAC control signal requesting the MAC operation, a MAC strobe signal for timing synchronization of the MAC operation, a bank address signal, and a column address signal to transmit the MAC control signal, the MAC strobe signal, the bank address signal, and the column address signal to the control circuit; and
a temperature detector configured to sense temperatures of the plurality of MAC units and configured to output a temperature signal at a logic "high" level to the control circuit when sensed temperature is higher than a setting value that causes deterioration in the MAC operation,
wherein the control circuit comprises:
a detecting block configured to output a dispersion MAC mode activation signal based on the MAC control signal, the MAC strobe signal, and the temperature signal; and
a control block configured to generate an all MAC mode control signal and a dispersion MAC mode control signal in response to the dispersion MAC mode activation signal and configured to generate an internal MAC strobe signal, an internal bank address signal, and an internal column address signal based on the all MAC mode control signal and the dispersion MAC mode control signal, and
wherein the detecting block comprises:
a MAC counter configured to count the number of pulses of the MAC strobe signal and to output a maximum counting signal at a logic "high" level when a counting value reaches a setting value;
a logic gate configured to generate an output signal at a logic "high" level when the temperature signal at a logic "high" level and a maximum counting signal at a logic "high" level are transmitted; and
a latch circuit configured to latch the output signal of the logic gate and to output the latched signal as the dispersion MAC mode activation signal in synchronization with a reference clock signal.

2. The PIM device of claim 1, further comprising a global buffer configured to provide vector data,
wherein the MAC operator is configured to perform a MAC operation on weight data that is provided from the memory bank and the vector data.

3. The PIM device of claim 1, wherein the command/address decoder is configured to receive setting data related to the dispersion MAC mode operation, to decode the setting data, and to output a mode register setting signal.

4. The PIM device of claim 3, further comprising a mode register configured to receive the mode register setting signal from the command/address decoder and configured to determine whether to perform the dispersion MAC mode operation.

5. The PIM device of claim 1, wherein the control circuit is configured to control the dispersion MAC mode operation when the number of pulses of the MAC strobe signal reaches a setting value and the temperature signal at a logic "high" level is transmitted.

6. The PIM device of claim 1, further comprising a mode register configured to generate a mode enable signal at a logic "high" level that enables the dispersion MAC mode operation to transmit the mode enable signal to the control circuit,
wherein the control circuit is configured to control the dispersion MAC mode operation when the number of pulses of the MAC strobe signal reaches a setting value, the temperature signal at a logic "high" level is transmitted, and the mode enable signal at a logic "high" level is transmitted.

7. The PIM device of claim 6, wherein the control circuit is configured to generate an internal MAC strobe signal that is identical to the MAC strobe signal during the all MAC mode operation and configured to generate an internal MAC strobe signal with more pulses than the MAC strobe signal during the dispersion MAC mode operation.

8. The PIM device of claim 7, wherein the control circuit is configured to generate an internal bank address signal for dispersing and selecting memory banks of the plurality of MAC units during the dispersion MAC mode operation.

9. The PIM device of claim 8, wherein the control circuit is configured to generate an internal column address signal that is identical to the column address signal during the entire MAC mode operation and configured to generate an internal column address signal configured by repeating the column address signal a plurality of times during the dispersion MAC mode operation.

10. The PIM device of claim 1, wherein the MAC counter is configured to receive the MAC control signal, the MAC strobe signal, and the reference clock signal and configured to perform one of a count-up operation on the number of pulses of the MAC strobe signal, a count-down operation on the reference clock signal, and a hold operation of stopping counting operation.

11. The PIM device of claim 10, wherein the MAC counter is configured to perform the count-up operation while pulses are generated in the MAC control signal and configured to perform the hold operation or the count-down operation while pulses are not generated in the MAC control signal.

12. The PIM device of claim 10, wherein the MAC counter is configured to maintain the setting value as the counting value when the maximum counting signal corresponds to the setting value.

13. The PIM device of claim 10, wherein the MAC counter is configured to perform the hold operation when the dispersion MAC mode activation signal at a logic "high" level is transmitted and configured to release the hold operation when the dispersion MAC mode activation signal at a logic "low" level is transmitted.

14. The PIM device of claim 1, further comprising a mode register configured to receive the mode register setting signal from the command/address decoder and configured to generate a mode enable signal at a logic "high" level that enables the dispersion MAC mode operation,
wherein the logic gate is configured to generate the output signal at a logic "high" level when the temperature signal at a logic "high" level, the maximum counting signal at a logic "high" level, and the mode enable signal at a logic "high" level are input.

15. The PIM device of claim 1, wherein the latch circuit is configured to change a logic level of the dispersion MAC mode activation signal from a logic "high" level to a logic "low" level when a reset signal at a logic "high" level is input.

16. The PIM device of claim 1, wherein the control block comprises:
a mode control signal generating circuit configured to generate the all MAC mode control signal and the dispersion MAC mode control signal in response to the dispersion MAC mode activation signal;
a MAC queue logic configured to store MAC queues that correspond to the pulses of the MAC control signal and configured to output the stored MAC queues according to a MAC mode that is determined by the all MAC mode control signal and the dispersion MAC mode control signal;
a phase generator configured to output a dispersion MAC strobe signal having more pulses than the MAC strobe signal according to a predetermined dispersion rate and a dispersion bank address for dispersing designation for the memory bank;
a first selector configured to output the dispersion MAC strobe signal or the MAC strobe signal as the internal MAC strobe signal according to a logic level of the dispersion MAC mode control signal; and
a second selector configured to output the dispersion bank address signal or the bank address signal as the internal bank address signal according to the logic level of the dispersion MAC mode control signal.

17. The PIM device of claim 16, wherein the MAC queue logic comprises:
a queue storage region configured to store and output the MAC queues and column addresses;
a counting circuit configured to count the number of the MAC queues in the queue storage region; and
a scheduling circuit configured to adjust an output order and an output method of the MAC queues in the queue storage region.

18. The PIM device of claim 17, wherein the counting circuit is configured to output a queue-full signal at a logic "high" level when the queue storage region is filled with the MAC queues and configured to output a queue-empty signal at a logic "high" level when the queue storage region is emptied.

19. The PIM device of claim 18, wherein the control circuit further comprises a monitoring block configured to receive the queue-empty signal at a logic "high" level and configured to generate a reset signal at a logic "high" level to transmit the reset signal to the detecting block, and
wherein the detecting block is configured to change a logic level of the dispersion MAC mode activation signal from a logic "high" level to a logic "low" level when the queue-empty signal at a logic "high" level is transmitted.

20. The PIM device of claim 19, wherein the monitoring block is configured to output dispersion MAC mode information indicating that the dispersion MAC mode is in operation to a data terminal.

21. The PIM device of claim 18, wherein the mode control signal generating circuit is configured to:
output the all MAC mode control signal at a logic "low" level and the dispersion MAC mode control signal at a logic "high" level when the dispersion MAC mode activation signal is at a logic "high" level; and
output the all MAC mode control signal at a logic "high" level and the dispersion MAC mode control signal at a logic "low" level when the dispersion MAC mode activation signal is at a logic "low" level.

22. The PIM device of claim 21, wherein the mode control signal generating circuit is configured to change the logic levels of the all MAC mode control signal and the dispersion MAC mode control signal to a logic "high" level and a logic "low" level, respectively, when the queue-full signal at a logic "high" level is transmitted while the dispersion MAC mode activation signal is at a logic "high" level.

23. The PIM device of claim 22,
wherein the phase generator is configured to transmit a last phase signal including a timing of a generation of a last pulse of the dispersion MAC strobe signal to the mode control signal generating circuit, and
wherein the mode control signal generating circuit is configured to change the logic levels of the all MAC mode control signal and the dispersion MAC mode control signal in synchronization with the last pulse of the dispersion MAC strobe signal based on the last phase signal.

* * * * *